United States Patent
Wang et al.

(10) Patent No.: US 9,578,650 B2
(45) Date of Patent: Feb. 21, 2017

(54) COORDINATED SCHEDULING WITH ADAPTIVE MUTING

(71) Applicant: NOKIA SOLUTIONS AND NETWORKS OY, Espoo (FI)

(72) Inventors: Xiaoyi Wang, Wheeling, IL (US); Eugene Visotsky, Buffalo Grove, IL (US); Anand Bedekar, Arlington Heights, IL (US); Bishwarup Mondal, Beavercreek, OH (US); Rajeev Agrawal, Glenview, IL (US); Naveen Arulselvan, Bangalore (IN); Suresh Kalyanasundaram, Bangalore (IN); Troels Emil Kolding, Klarup (DK); Hans Kroener, Geislingen-Weiler (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 29 days.

(21) Appl. No.: 14/175,809

(22) Filed: Feb. 7, 2014

(65) Prior Publication Data
US 2015/0063222 A1 Mar. 5, 2015

Related U.S. Application Data

(63) Continuation-in-part of application No. 14/018,078, filed on Sep. 4, 2013.

(51) Int. Cl.
*H04W 24/02* (2009.01)
*H04W 72/04* (2009.01)
*H04W 72/12* (2009.01)

(52) U.S. Cl.
CPC ...... *H04W 72/1226* (2013.01); *H04W 24/02* (2013.01); *H04W 72/0426* (2013.01)

(58) Field of Classification Search
None
See application file for complete search history.

(56) References Cited

U.S. PATENT DOCUMENTS

| 8,520,550 B2* | 8/2013 | Al-Dhahir | H04B 7/0413 370/252 |
| 8,976,749 B2* | 3/2015 | Sun | H04L 5/0007 370/310 |

(Continued)

FOREIGN PATENT DOCUMENTS

| WO | 2010/025286 A2 | 3/2010 |
| WO | WO 2012/044019 A2 * | 4/2012 |
| WO | 2013/112189 A1 | 8/2013 |

OTHER PUBLICATIONS

International Search Report application No. 2014P00127WO dated Feb. 17, 2015.

(Continued)

*Primary Examiner* — Candal Elpenord
(74) *Attorney, Agent, or Firm* — Squire Patton Boggs (US) LLP

(57) ABSTRACT

Systems, methods, apparatuses, and computer program products relating to coordinated scheduling with adaptive muting are provided. One method comprises transmitting, by a network element, calculated impact information for a cell of the network element when taking an action related to a cell of the network element and/or taking an action related to a cell of a second network element. The method may also comprise transmitting a request for taking the action related to the cell of the second network element under certain circumstances.

24 Claims, 20 Drawing Sheets

(56) References Cited

U.S. PATENT DOCUMENTS

| | | |
|---|---|---|
| 2009/0219897 A1 | 9/2009 | Pajukoski et al. |
| 2010/0029282 A1 | 2/2010 | Stamoulis et al. |
| 2010/0202402 A1 | 8/2010 | Dalsgaard et al. |
| 2010/0238884 A1 | 9/2010 | Borran et al. |
| 2011/0243004 A1 | 10/2011 | Giese et al. |
| 2011/0300807 A1 | 12/2011 | Kwun et al. |
| 2011/0319090 A1* | 12/2011 | Vajapeyam ............ H04W 24/02 455/450 |
| 2012/0028630 A1 | 2/2012 | Yamamoto et al. |
| 2012/0315907 A1* | 12/2012 | Chin ..................... H04W 36/22 455/436 |
| 2013/0044704 A1* | 2/2013 | Pang ................. H04W 72/0426 370/329 |
| 2013/0045740 A1* | 2/2013 | Gayde .................... H04W 48/06 455/436 |
| 2013/0114496 A1 | 5/2013 | Mazzarese et al. |
| 2013/0121222 A1* | 5/2013 | Luo ....................... H04W 36/20 370/311 |
| 2013/0223258 A1* | 8/2013 | Seo ....................... H04W 24/02 370/252 |
| 2013/0281105 A1* | 10/2013 | Ren ....................... H04W 28/26 455/452.1 |
| 2015/0065108 A1 | 3/2015 | Bedekar et al. |

OTHER PUBLICATIONS

US Office Action dated Jul. 6, 2015, for co-pending U.S. Appl. No. 14/018,078.

* cited by examiner

| IE/Group Name | Presence | IE type and reference | Semantics description |
|---|---|---|---|
| (Example 1) Priority and Benefit metric Per PRB | M | BIT STRING (6..110, ...) ENUMERATED (0, 1, 2, 3, ...) | Each position in the bitmap and enumeration represents a $n_{PRB}$ value (i.e. first bit or first value in the enumerated string=PRB 0 and so on). The bit value represents *priority* ($n_{PRB}$), defined in TS 36.213. Value 0 indicates "PRB is low priority". Value 1 indicates "PRB is high priority". In the enumerated string value 0, 1, 2, 3, ... indicates the value of benefit metric=0, 1, 2, 3, ... |
| (Example 2) Priority Per PRB | M | BIT STRING (6..110, ...) | Each position in the bitmap represents a $n_{PRB}$ value (i.e. first bit=PRB 0 and so on), for which the bit value represents *priority* ($n_{PRB}$), defined in TS 36.213. Value 0 indicates "PRB is low priority". Value 1 indicates "PRB is high priority". |

Fig. 6(b)

COORDINATED SCHEDULING WITH ADAPTIVE MUTING

CROSS REFERENCE TO RELATED APPLICATION

This application is a continuation-in-part of application Ser. No. 14/018,078, filed Sep. 4, 2013.

BACKGROUND

Field

Embodiments of the invention generally relate to mobile communications networks, such as, but not limited to, the Universal Mobile Telecommunications System (UMTS) Terrestrial Radio Access Network (UTRAN), Long Term Evolution (LTE) Evolved UTRAN (E-UTRAN), and/or LTE-A.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network (UEs are also commonly known as user devices or just users). The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the enhanced Node B (eNodeB or eNB).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Further releases of 3GPP LTE (e.g., LTE Rel-10, LTE Rel-11, LTE Rel-12) are targeted towards future international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A will be a more optimized radio system fulfilling the international telecommunication union-radio (ITU-R) requirements for IMT-Advanced while keeping the backward compatibility.

SUMMARY

One embodiment is directed to a network element comprising at least one processor, and at least one memory comprising computer program code. The at least one memory and the computer program code configured, with the at least one processor, to cause the network element at least to transmit at least one of: calculated impact information for a cell of the network element when taking an action related to a cell of the network element and/or when taking an action related to a cell of a second network element, and a request for taking the action related to the cell of the second network element.

Another embodiment is directed to a network element comprising at least one processor, and at least one memory comprising computer program code. The at least one memory and the computer program code configured, with the at least one processor, to cause the network element at least to receive at least one of: impact information for a cell of a second network element when taking an action related to the cell of the second network element, and/or when taking an action related to a cell of the network element, a request from the second network element for taking an action related to a cell of the network element, and a command from a central network element for taking an action related to a cell of the network element. The network element may be further caused to take the action related to the cell of the network element based at least on one of the received impact information, the command, or the request.

Another embodiment is directed to a centralized network element comprising at least one processor, and at least one memory comprising computer program code. The at least one memory and the computer program code configured, with the at least one processor, to cause the centralized network element at least to receive from a first network element at least one of: impact information for a cell of the first network element when taking an action related to a cell of the first network element, or when taking an action related to a cell of a second network element, and a request for taking an action related to the cell of the second network element. The centralized network element may be further caused to transmit a command for taking the action related to the cell of the second network element based on the received impact information and/or request.

Another embodiment is directed to a network element comprising transmitting means for transmitting at least one of calculated impact information for a cell of the network element when taking an action related to a cell of the network element and/or when taking an action related to a cell of a second network element, and requesting means for requesting to take the action related to the cell of the second network element.

Another embodiment is directed to a network element comprising receiving means for receiving at least one of impact information for a cell of a second network element when taking an action related to the cell of the second network element, and/or when taking an action related to a cell of the network element, a request for the second network element for taking an action related to a cell of the network element, and a command from a central network element for taking an action related to a cell of the network element. The network element can also include action means for taking the action related to the cell of the network element based on at least one of the received impact information, the command, or the request.

In another embodiment, a centralized network element can include receiving means for receiving, from a first network element, at least one of impact information for a cell of the first network element when taking an action related to a cell of the first network element, or when taking an action related to a cell of a second network element, and a request for taking an action related to the cell of the second network element. The centralized network element may also comprise transmitting means for transmitting a command for taking the action related to the cell of the second network element based on the received impact information and/or request.

Another embodiment is directed to a method comprising transmitting, by a network element, at least one of: calculated impact information for a cell of the network element when taking an action related to a cell of the network element and/or taking an action related to a cell of a second network element, and a request for taking the action related to the cell of the second network element.

Another embodiment is directed to a method comprising receiving, by a network element, at least one of: impact information for a cell of a second network element when taking an action related to the cell of the second network element, and/or when taking an action related to a cell of the network element, a request from the second network element for taking an action related to a cell of the network element, and/or a command from a central network element for taking an action related to a cell of the network element. The method may further comprise taking the action related to the cell of the network element based on at least one of the received impact information, the command, or the request.

Another embodiment is directed to a method comprising receiving, by a centralized network element, from a first network element at least one of: impact information for a cell of the first network element when taking an action related to a cell of the first network element, or when taking an action related to a cell of a second network element, and/or a request for taking an action related to the cell of the second network element. The method may further comprise transmitting a command for taking the action related to the cell of the second network element based on the received impact information and/or request.

In another embodiment, the invention is directed to a computer program product embodied on a non-transitory computer-readable medium, said computer program product including computer executable code which, when executed on a processor, controls the processor to transmit at least one of: calculated impact information for a cell of the network element when taking an action related to a cell of the network element and/or when taking an action related to a cell of a second network element, and a request for taking the action related to the cell of the second network element.

In another embodiment, the invention is directed to a computer program product embodied on a non-transitory computer-readable medium, said computer program product including computer executable code which, when executed on a processor, controls the processor to receive at least one of: impact information for a cell of a second network element when taking an action related to the cell of the second network element, and/or when taking an action related to a cell of the network element, a request from the second network element for taking an action related to a cell of the network element, and a command from a central network element for taking an action related to a cell of the network element. The network element may be further caused to take the action related to the cell of the network element based at least on one of the received impact information, the command, or the request.

In another embodiment, the invention is directed to a computer program product embodied on a non-transitory computer-readable medium, said computer program product including computer executable code which, when executed on a processor, controls the processor to receive from a first network element at least one of: impact information for a cell of the first network element when taking an action related to a cell of the first network element, or when taking an action related to a cell of a second network element, and a request for taking an action related to the cell of the second network element. The centralized network element may be further caused to transmit a command for taking the action related to the cell of the second network element based on the received impact information and/or request.

In another embodiment, the invention can also comprise a system, comprising a first network element and a second network element. The first network element can have a processor and a memory comprising computer program code, with the memory and computer program code being configured to cause the first network element to transmit at least one of calculated impact information for a cell of the first network element when taking an action related to a cell of the network element or when taking an action related to a cell of a third network element, and a request for taking the action related to the cell of the third network element. The second network element of the system can also comprise a processor and a memory comprising computer program code. The memory and the computer program code of the second network element can be configured, with the processor, to cause the second network element to receive impact information from the first network element, or the request from the first network element, or a command from a central network element for taking an action related to the cell. The second network element is also configured to take the action related to the cell based on at least one of the received impact information, the command, or the request.

In another embodiment, the invention can comprise a system comprising a centralized network element having at least one processor and at least one memory comprising computer program code, wherein the at least one memory and the computer program code are configured, with the at least one processor, to cause the centralized network element at least to receive, from a first network element, at least one of impact information for a cell of the first network element when taking an action related to a cell of the first network element, or when taking an action related to a cell of a second network element, and a request for taking an action related to the cell of the first network element or the cell of the second network element, and to transmit a command for taking the action related to the cell of the first network element or the cell of the second network element based on the received impact information and/or request.

In another embodiment, the at least one memory and the computer program can be configured to transmit, as the calculated impact information, benefit/penalty information which further comprises an indication of quality of service characteristics.

In another embodiment, methods of the invention can include transmitting, as the calculated impact information, benefit/penalty information which further comprises an indication of quality of service characteristics.

In another embodiment, the calculated impact information can be benefit/penalty information which is calculated based on a specific user device.

In another embodiment, the network element can be a base station or an access point.

In another embodiment, the at least one memory and the computer program code of the network element are configured, with the at least one processor, to cause the network element at least to calculate a penalty/benefit for taking the action, and to calculate a net benefit based on the received impact information and the calculated penalty/benefit information. The network element can also be caused to determine whether to undertake the action based on the calculated net benefit. The determining of whether to undertake the action based on the calculated net benefit can, in certain embodiments, comprise determining specific resources on which the action will be undertaken.

In certain embodiments, the network element can be caused to communicate a notification of the determination of undertaking the action to at least one other network element.

In certain embodiments, the centralized network element can comprise a core network element.

In any of the methods noted above, an additional step of calculating the benefit/penalty information based on a specific user device can be implemented.

Also in any of the methods noted above, the determining whether to undertake the action based on the calculated net benefit can further comprise determining specific resources on which the action will be taken.

Also in the methods noted above, a further step of communicating a notification of the determination of undertaking the action to at least one other network element can be performed.

Also in the network element noted above, the benefit/penalty information includes a benefit/penalty-metric value that is calculated using channel-status information.

Also in the network element noted above, the benefit/penalty information further includes a priority factor associated with the benefit/penalty-metric value.

Also in the network element noted above, the priority factor is based on at least one of a congestion of a physical-downlink-control-channel/enhanced-physical-downlink-control-channel, a use of range extension, and Quality-of-Service characteristics of a data channel transmission.

Also in the network element noted above, the priority factor and the benefit/penalty-metric value are transmitted via X2 signaling.

Also in the network element noted above, the priority factor and the benefit/penalty-metric value are transmitted in a same message.

BRIEF DESCRIPTION OF THE DRAWINGS

For proper understanding of the invention, reference should be made to the accompanying drawings, wherein:

FIG. 6(b) illustrates options for signaling a priority metric.

DETAILED DESCRIPTION

Figure 1:
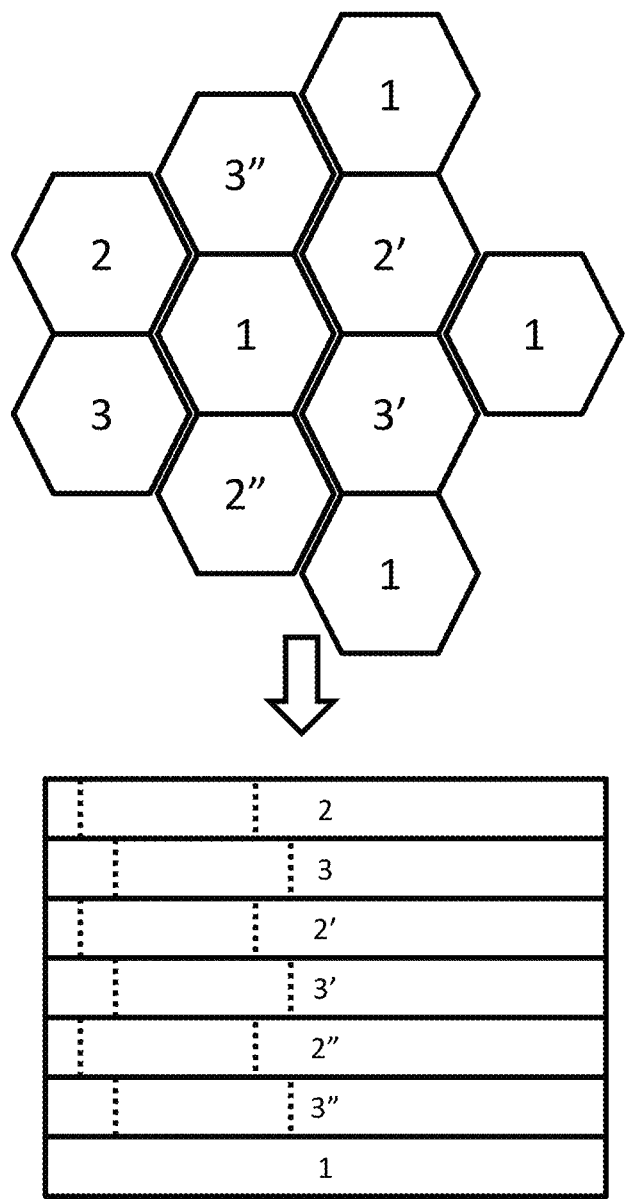
FIG. 1 illustrates an example of interference hypotheses, according to an embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products relating to coordinated scheduling with adaptive muting, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Embodiments of the invention relate to coordinated scheduling of transmission resources among a set of cells utilizing a technique of "muting" the transmission on one or more cells so that neighbor cells can schedule UEs that can get significant spectral efficiency gain in the muted resources. It should be noted that the term "cell" is used interchangeably to denote an area of wireless service in which user devices are served by a particular transmitter, or the transmitter itself, or the base station for that cell or transmitter, or the eNodeB (eNB) as the base station is commonly referred to in the Long Term Evolution (LTE) technology, or any other network element. No restriction is made in this respect.

For interference and scheduling coordination between a set of cells, one technique is to have one or more cells "mute" transmissions on some set of resources to provide reduced interference to neighbor cells within the muted resources and so that neighbor cells can schedule UEs that can acquire significant spectral efficiency gain in the muted resources. The set of cells could be a set of macro cells, or a combination of macro and pico cells in a heterogeneous network.

Muting may be either turning off certain transmissions, or reducing power (low power). For example, in LTE, the transmissions on the Physical Downlink Shared Channel (PDSCH) may be turned off, while other transmissions such as common reference signals or System Information Broadcast (SIB) messages may be still transmitted. In addition, muting could be in the frequency domain (e.g., some subset of physical resource blocks (PRBs) or resource block groups (RBGs)), or in a combination of time and frequency domain (e.g., certain PRBs in various sub-frames). Thus, a cell has an "on duration" comprised of the time and frequency resources where the cell is not muted, and the rest of the resources are the cell's "off duration."

It should be noted that muting is a tradeoff. Neighbor cells may gain from reduced interference, but the muting cell has to give up some capacity. Accordingly, it is important to adapt the muting in order to achieve the right amount of muting. Too little muting may provide insufficient benefit(s), while too much muting may cause an unnecessary loss of capacity.

Coordinated scheduling should also exploit frequency selectivity in the channel. If the muting is applied in a predefined frequency-omain pattern, the UEs that could benefit from muting may have a poor channel in the sub-bands where muting is applied due to frequency-selective fading. Thus, in addition to determining the right "amount" of muting for each cell, the right cell should mute on the right sub-band so as to allow the correct UEs (based on frequency-selective fading) to be scheduled in those sub-bands. Accordingly, for maximum efficiency, having a muting and coordinated scheduling scheme in the method of muting will help the coordinated scheduling exploit both muting and frequency selectivity gain.

Further, in order to maximize the benefit of muting, it may be desirable that in the resources in which a cell mutes, a neighbor cell that could have benefited should not itself be muted. If the muting decisions are highly dynamic and frequency selective, it may be important that the coordinated scheduling/muting between the eNBs should prevent such loss of muting benefit. It may be also desirable that the all potential beneficiaries are accounted for in the determination of the muting benefit and that a cell which mutes should have a better net benefit due to muting compared to other cells in its neighborhood.

In addition to the above actions, another action that could be meaningfully undertaken to coordinate scheduling and interference involves using beamforming One or more cells can appropriately beamform their transmissions on a selected set of resources using appropriate beamforming weights, so as to produce reduced interference to certain users in neighbor cells. This is sometimes known as "coordinated beamforming". In contrast to muting, coordinated beamforming allows the beamforming cells to transmit some information, whereas muting would have prevented those cells from transmitting some or any information. Similar to muting, coordinated beamforming also involves a tradeoff—choice of beamforming weights that would provide reduced interference may result in significantly reduced spectral efficiency for the beamforming cell. Thus, similar considerations as noted above for coordinated scheduling and muting also apply for coordinated beamforming. Similarly, another action that could be taken is to restrict certain transmission modes, for example to enforce lower rank transmissions. This can have the effect of boosting the performance of UEs in other cells that employ certain type of receivers such as Interference Rejection Combining (IRC) receivers. In the following description, we concentrate on muting for simplifying the description. But it should be noted that the foregoing description applies equally well to any of the other forms of the actions that cells could take to coordinate the interference.

In view of the above, certain embodiments provide a method to adapt the muting used by each cell. Furthermore, some embodiments provide a method to adapt the muting so that the right cells mute on each sub-band (or RBG) so as to exploit both muting and frequency-selective scheduling (FSS) gains, and so that muting gain is maximized by (a) avoiding situations where a cell mutes but a potential beneficiary neighbor also mutes in the same resources and (b) ensuring that the cells that "locally" have the strongest net benefit mute. The methods according to embodiments of the invention have low complexity and facilitate decentralized/parallelizable implementation.

One embodiment is directed to a method that adapts the muting employed by each cell. The method may comprise calculating a metric (e.g., based on a combination of the channel quality and load), that represents the benefit (or penalty) obtained by increasing (or decreasing) the cell's On-duration or its transmit power, and calculating a metric for each other cell that would be affected by the given cell's increase (or decrease) of its On duration or increase (decrease) of its transmit (TX) power, representing the penalty (or benefit) to the other cell due to the given cell increasing (or decreasing) its On duration or increase (decrease) its TX power. A preferred set of resources (e.g., time/frequency resources) for expanding (or shrinking) the On duration or increase (decrease) the TX power is determined. Then, a net benefit (or net penalty) to the system due to the given cell increasing (or decreasing) its On duration or increase (decrease) its TX power is calculated. If the net benefit is positive (or net penalty is negative), then the cell can expand (or shrink) its On duration or increase (decrease) its TX power. The metrics for benefit and penalty may be based on differing QoS needs, differing radio conditions (including radio conditions of specific user devices), differing load, differing ability to reuse muted resources, etc.

According to an embodiment, if multiple cells can provide a positive net benefit (or negative net penalty) due to expanding (or shrinking) their On duration or due to increase (decrease) their TX power, then one or more of the cells may be chosen based on the magnitude of the net benefit (or net penalty).

The exact time and frequency resources selected for the expansion (or shrinking) or increase/decrease may be the preferred set of resources determined above for the expansion/shrinking of the chosen cells or the increase/decrease of TX power. In an embodiment, the decision to change the muting can be made in each transmission time interval (TTI)—possibly based on specific users being scheduled on specific resources in each TTI, at a slower time-scale such as once every N TTI, or when some condition is encountered relating to congestion or overload or inability to meet QoS or guaranteed/nominal bit-rate, etc. In an embodiment, the decision to change the muting may be made separately for each frequency resource (e.g. for each resource or resource block group in LTE).

Once a decision to adapt the muting is made, it can persist for some length of time. For example, the time period of the muting may be only one TTI, N TTI, or until the congestion or overload condition subsides, etc. In some embodiments, the decision to adapt the muting may further include determining or communicating a specific time at which the decision will go into effect. This may be used, for example, when there are variable communication delays on the links, so that a coordination of the starting time of the decided muting can be achieved by the use of the time at which the decision will go into effect.

The trigger to modify the muting may also use other factors, such as the speed of the UEs (the distribution of the speed of the UEs, or the number of UEs corresponding to for example high or medium or low speed, etc.). For high-speed or even medium speed UEs, it is often difficult to properly exploit frequency domain fading with channel aware scheduling because the channel fades can change too rapidly. For such UEs, it may be advantageous to use resources on which interference is muted, since the UE's channel feedback and control loops used by the eNB such as outer loop link adaptation can better reflect the achievable spectral efficiency within muted resources.

FIG. 1 illustrates an example of interference hypotheses. With respect to coordinated scheduling, an 'interference hypothesis' denotes a potential state of one or more cells in the network for the purposes of coordinating the interference. In one embodiment, certain cells assume an 'On' or 'Off' state. In some embodiments, cells may use different power levels, rather than being 'On' or 'Off', while in other embodiments, cells may make use of certain beamforming weights. An 'interference hypothesis' provides an indication of the level of interference that would experienced by user devices in neighboring cells due to the action taken by the one or more cells. 'Interference hypotheses' may also be known variously as 'muting combinations' or 'muting scenarios' or 'beamforming combinations' or the like. As illustrated in FIG. 1, from cell 1's perspective, each of the neighbor sectors (2, 3, 2', 3', 2", 3") could be On or Off in a given "resource" (combination of time/frequency—e.g., a physical resource block (PRB) or a resource block group (RBG) in the Long Term Evolution (LTE) technology). In time and frequency, cell 1 will experience various combinations of On/Off of various neighbor cells. An interference hypothesis is an N-tuple representing the On-Off states of each cell (e.g., 1=ON, 2=ON, 3=OFF, 2'=OFF, 3'=ON, 2"=ON, 3"=OFF). Thus, it may be said that a given interference hypothesis occurs in a specific time-frequency resource, depending on the On/Off states of the cells. From the point of view of a given UE served by a given cell, an interference hypothesis also provides an indication of the level of interference seen by the UE.

The coordination between cells may take various forms in different embodiments. For example, the coordination may involve the selection of an interference hypothesis, or the determination of a change from one hypothesis to another, or the determination of the state of one or more cells, or the determination of the change in the state of one or more cells. The coordination may be made in relation to a specific set of resources. In some embodiments, the set of resources itself may be determined. In some embodiments, the coordination may involve determination of the number of resources on which the selections or determinations are to apply. The selection of an interference hypothesis, or the change from one interference hypothesis to another, may also be construed as one or more actions undertaken for the purposes of coordination between the cells. For example, the selection of a hypothesis wherein Cell 1 is Off may be considered as an action undertaken to mute Cell 1, while the selection of a hypothesis wherein Cell 1 is On may be considered as an action undertaken to not mute Cell 1. Conversely, an action undertaken to mute a given cell, say Cell 1, may be considered as part of the selection of an interference hypothesis, even though the states of the other cells may or may not be determined by the action undertaken to mute the given cell. The action may be in relation to a set of resources, or in relation to an amount of resources. The terms selection of a hypothesis or determination of a hypothesis or action to mute (or otherwise determine the state of) one or more cells are used interchangeably, and no restriction is made in this regard. Furthermore, no restriction is made in respect of whether the action is undertaken by or at a given cell, or by or at any other network element.

Although only "first ring" neighbors are depicted in FIG. 1, further-out sites (e.g., 2nd ring neighbors) can potentially be part of the interference hypothesis definition, especially in deployments with small inter-site distance.

In general, any suitable set of cells may be considered as part of a 'cluster of coordinating cells'. These may include all the cells of a given cell site, or cells from multiple cell sites, or all cells that can cause sufficiently strong interference, etc. In some embodiments, a cluster may comprise a pre-determined group of cells. One configuration of such clusters of cells has the property that one cluster of coordinating cells does not overlap with another cluster of coordinating cells, a configuration known as 'non-overlapping clusters'. In this configuration, two coordinating clusters of cells do not have any cells in common. Typically the scheduling or decision on the selection of interference hypotheses may be coordinated among the cells within a given cluster of coordinating cells. In some embodiments, the relevant interference hypotheses may be then limited to the interference states of the cells within a coordinating cluster. In some embodiments, the feedback reporting from the user devices may be appropriately configured to provide information on the channel quality experienced by the user device under various interference hypotheses. In some embodiments, when non-overlapping clusters are used, a UE may not be configured to provide feedback representing their experienced channel quality to reflect interference states of its strong interferers if the interferers are not part of the same coordinating cluster as the UE's serving cell.

A UE served from a given serving cell can achieve a certain performance under a given interference hypothesis, for example, a channel quality indicator (CQI) or spectral efficiency achieved when a given set of interferers is On or Off. A certain UE may be sensitive only to the On/Off state of its strongest interferer. For such a UE, the states of the other neighbors in a given interference hypothesis may not matter to the performance achievable by the UE in a given interference hypothesis.

Any candidate change in muting can be interpreted as changing a resource from a current hypothesis (h1) to a new hypothesis (h2). Supposing that, currently, resources ρi are used for hypothesis hi, and cell c obtains a utility function value Fc(hi;ρi) from the resources ρi used for hypothesis hi. Accordingly, the cell currently obtains a total utility function value of Σi Fc(hi;ρi) (summed over all hypotheses).

When the hypothesis on some slice of resources Δρ is changed from h1 to h2, the net resources under hypothesis h1 will change to ρ1−Δρ and the net resources under hypothesis h2 will change to ρ2+Δρ. Thus, a cell's utility will change from Fc(h1;ρ1)+Fc(h2;ρ2) to Fc(h1;ρ1−Δρ)+Fc(h2;ρ2+Δρ), i.e., a net change of [Fc(h2;ρ2+Δρ)−Fc(h2;ρ2)]−[Fc(h1;ρ1)−Fc(h1;ρ1−Δρ)]. Therefore, some cells will benefit due to the change because their net change in utility will be positive; while other cells will be "penalized" because their net change will be negative. The change in utility of cell c can be approximated as Δρ[Uc(h2;ρ2)−Uc(h1;ρ1)], where the function Uc is the gradient of the function F. From the perspective of the coordinating cluster of cells as a whole, it is beneficial to consider the total benefit (or penalty) accrued across all the cells in the cluster due to the change Δρ.

According to an embodiment, the muting adaptation provides that the candidate change in muting may be preferable when the net benefit across all cells is sufficiently large, i.e., $\Sigma_c[Uc(h2)-Uc(h1)]>0$ (or $>\epsilon$ for some suitable positive value $\epsilon$), or when the aggregate change over the set of cells that benefit (denoted 'B') is sufficiently greater than the aggregate penalty over the set of cells that are penalized (denoted 'P'). Mathematically this may be expressed as $[\Sigma_{c\in B}(Uc(h2)-Uc(h1))]-[\Sigma_{c\in P}(Uc(h1)-Uc(h2))]>0$. Alternatively the candidate change in muting may be preferable if this net benefit is sufficiently large, for example if $[\Sigma_{c\in B}(Uc(h2)-Uc(h1))]-[\Sigma_{c\in P}(Uc(h1)-Uc(h2))]>\epsilon$, for an appropriately chosen positive value of $\epsilon$, i.e., if the net benefit, which is the aggregate benefit less the aggregate penalty, is sufficiently large. In some embodiments, the aggregate benefit (or penalty) may be computed as a weighted sum rather than a regular summation. This allows using different weights for different cells, for example when some cells are considered more important than others. For example, macro cells may be considered more important than pico cells, or vice-versa. Another example is where certain cells are known to be supporting traffic from a high public importance event such as a festival, and then the benefit (or penalty) to such cells may be provided higher weightage when computing the aggregate benefit (or penalty).

In the following, the function U is referred to as "utility", although U can be interpreted as the gradient of a suitable utility function F.

Figure 2:
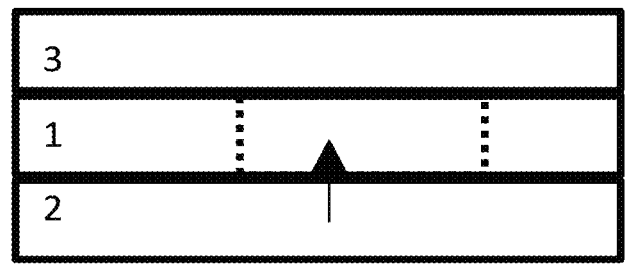
FIG. 2 illustrates an example scenario of a muting adaptation, according to an embodiment.
Figure 3:
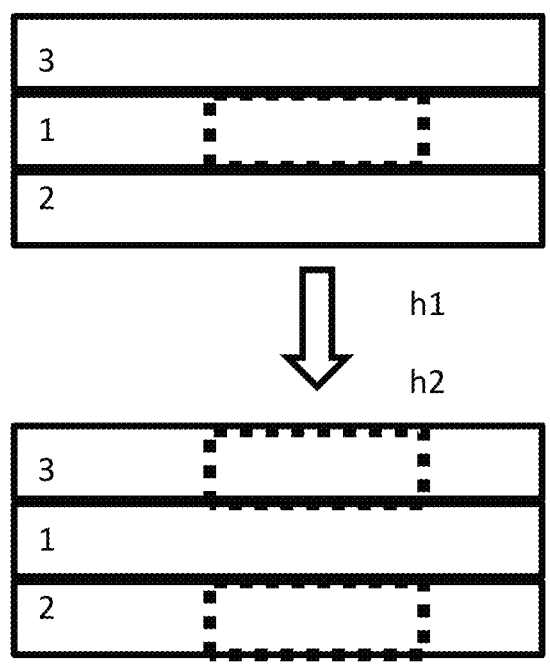
FIG. 3 illustrates another example scenario of a muting adaptation, according to an embodiment.

FIG. 2 illustrates an example scenario of a muting adaptation, according to an embodiment. As depicted in FIG. 2, multiple cells (2, 3, . . . ) want to use a certain PRB, and want cell 1 to mute that PRB. Alternatively, cell 2 wants to use a certain PRB and wants cell 1 to mute, but it is known cells 3, . . . n will also benefit. The current hypothesis h1 is: cells 2, 3, . . . n are On, and cell 1 is On. The new hypothesis h2 is: cell 1 is Off, and cells 2, 3, . . . n are On. In this example scenario, cell 1's utility under h1 is U1(h1), and under h2 is 0 (since it is Off). Thus, cell 1's benefit due to changing from h1 to h2 is negative, i.e., cell 1 has a penalty of U1(h1)−U1(h2)=U1(h1). However, cells 2, 3, . . . n have a benefit due to cell 1's muting, i.e., Uc (h2)−Uc(h1)>0. According to this example, the muting adaptation can be adopted if the aggregate benefit to cells 2, 3, . . . n is sufficiently greater than the penalty to cell 1, that is, if the net benefit summed over all the cells 1, 2, 3, . . . , n is positive FIG. 3 illustrates another example scenario of a muting adaptation, according to an embodiment. In the example of FIG. 3, cell 1 wants to use a certain PRB which it has currently muted. Cells 2, 3, . . . n which are currently using that PRB would be impacted by cell 1's change. As a further variation, cell 1 may want cell 2, 3, . . . n to mute that PRB instead. The current hypothesis h1 has cell 1 Off, and 2, 3, . . . n are On. The new hypothesis is h2, where cell 1 is On, and cells 2, 3, . . . n are Off. Cell 1's utility under h1 is 0, and under h2 is U1(h2). Thus, cell 1's benefit due to changing from h1 to h2 is U1(h2)>0. Cells 2, 3, . . . n have a penalty, equal to the utility Uc(h1) they are currently receiving by using that resource hypothesis h1. In this example, the muting adaptation can be adopted if the benefit to cell 1 is sufficiently greater than the aggregate penalty to cells 2, 3, . . . n. Also, it is noted that when cells 2, 3, . . . n mute, yet other cells may also be able to benefit from the reduced interference from cells 2, 3, . . . n. Thus, the benefit to such cells may be considered in addition to the benefit of reduced interference to cell 1. Conversely, since cell 1 will go from muted to non-muted, its increased interference may cause a penalty to yet other cells, which can also be considered.

Figure 4:
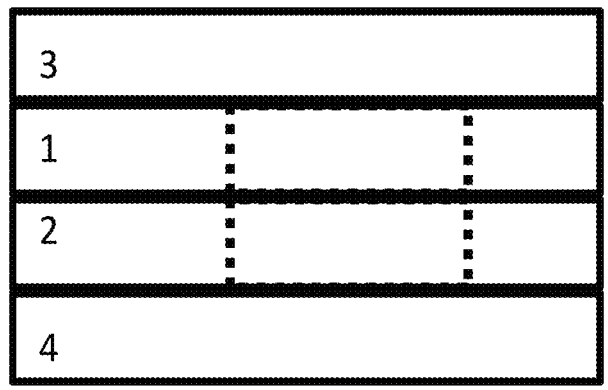
FIG. 4 illustrates another example scenario of a muting adaptation, according to an embodiment.

FIG. 4 illustrates another example scenario of a muting adaptation, according to an embodiment. In the example of FIG. 4, cell 1 wants to use a certain resource (e.g., a physical resource block or PRB in LTE) that it is currently muting, and wants cell 2 to mute that resource (e.g., a PRB). This change would result in a benefit for cell 1 and a penalty for cell 2. In addition, other cells may be affected by the change. For example, by muting the PRB, other neighbors of cell 2 in principle might be able to benefit as well, such as cell 4 in FIG. 4. Similarly, by cell 1 using its PRB, a penalty might not only result for cell 2 who loses a PRB, but for other neighbors of cell 1, such as cell 3 in FIG. 4, which now receives increased interference.

In the example of FIG. 4, the benefit/penalty on each of these other cells may also be explicitly considered in the calculation of the net benefit for determining the muting. Alternatively, the net benefit may be approximated as: α[U1(h2)−U1(h1)]−β[U2(h1)−U2(h2)], where typically α<1 (from a system perspective, benefit to cell 1 is reduced due to increased interference it causes) and typically β<1 (from a system perspective, penalty due to cell 2's loss of PRB is also reduced, since there is some benefit to other eNBs by Cell 2's muting). Since h1 corresponds to cell 1 muted, and h2 corresponds to cell 2 muted, the above may just be expressed as α[U1(h2)]−β[U2(h1)].

Figure 5:
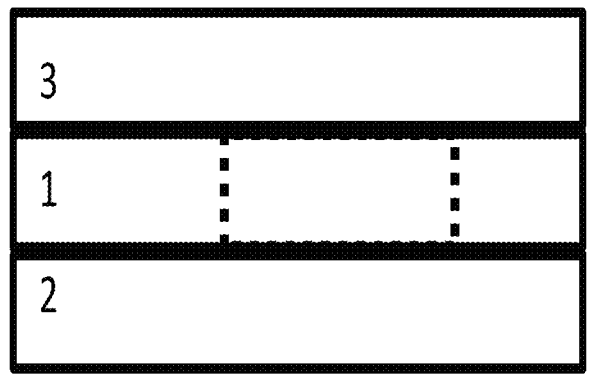
FIG. 5 illustrates another example scenario of a muting adaptation, according to an embodiment.

FIG. 5 illustrates another example scenario of a muting adaptation, according to an embodiment. In the example of FIG. 5, cell 1 is currently muted in a certain resource (e.g., PRB), but wants to use it, without requiring any other cell to mute. This change would cause an interference impact to other cells which are currently benefiting from the muted resource (e.g., PRB), and their "utility" from that resource (e.g., PRB) would be reduced. The Relevant hypotheses are: h2 corresponding to cell 1 On, and h1 corresponding to cell 1 Off (the state of all other cells remains the same). The benefit to cell 1 is U1(h2), and the penalty (i.e. negative benefit) to each other cell is Uc(h1)−Uc(h2) due to the increased interference from cell 1. For cells that are not interfered by cell 1, the change in utility is 0. Again in this case, the net benefit consisting of the sum total of the benefit to cell 1 and the (negative) benefit to each other cell would be used in determining whether the change from h1 to h2 would be provide a net benefit to the system.

In an embodiment, the benefit of selecting a particular hypothesis may be calculated relative to a reference hypothesis, rather than to a certain hypothesis that is currently in operation. For example, a reference hypothesis may be the one in which al the cells are in the On state, which we may denote as h0. A given cell c would obtain a utility Uc(h0) if all the relevant cells were in the On state. Cell c would obtain a utility Uc(h1) under a certain muting hypothesis h1. Thus Cell c may calculate its benefit relative to the reference hypothesis as Uc(h1)−Uc(h0). Similarly a given cell may calculate its penalty relative to a reference hypothesis. For example, if cell c were to be in a muted (Off) state in a certain hypothesis h1, then cell c's penalty for adopting the hypothesis h1 may be represented as Uc(h0)−Uc(h1). Depending on the definition of the function U, Uc(h1) may be 0 if cell c is in the Off state in hypothesis h1. So Cell c's penalty would be equivalently Uc(h0). It should be understood that in any of the embodiments mentioned herein, the indication of the benefit (or penalty as the case may be) may be calculated and represented relative to a reference hypothesis.

According to certain embodiments, there may be multiple possible changes in muting that could be done. Multiple cells may be eligible to change muting state on a given time-frequency resource—corresponding to multiple candidate hypothesis h2, and/or the change in muting state of a cell could be made on multiple possible candidate resources (i.e., on each candidate resource there might be a different h1 and h2). In this case, the decision may be made by picking one or more candidate cells or resources based on the above metrics. For example, the top K (new hypothesis h2, resource R) combinations may be selected in descending order of a metric representing the net benefit, such as benefit minus penalty, or ratio of benefit to penalty, over the relevant cells/hypotheses and resources. It may be noted that in any given muting hypothesis, more than one cell may be in a muted state. That is, there may be combinations of multiple muters, and the determination of benefits and penalties relative to some hypotheses are then computed based on which (possibly multiple) cells are muting.

Figure 6A:
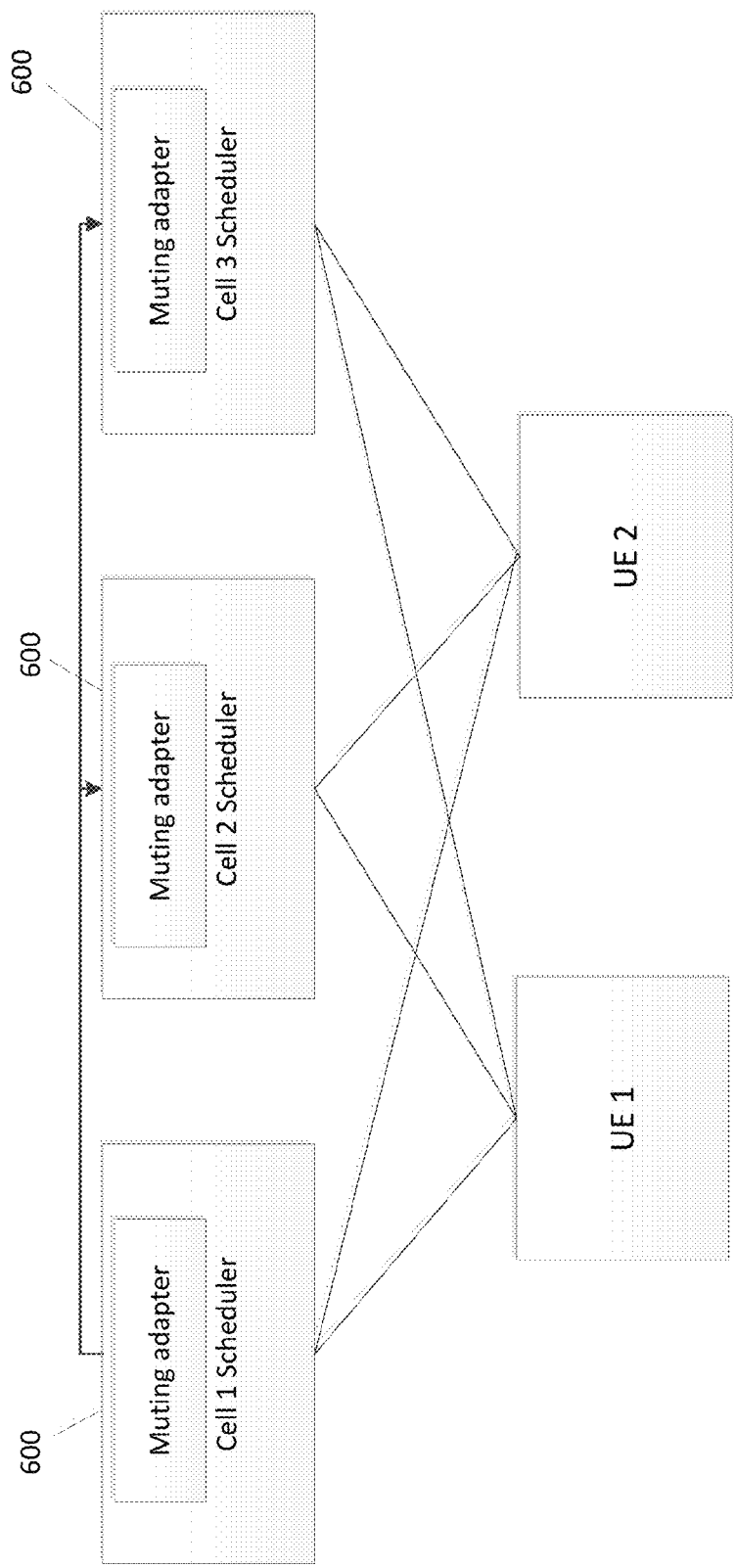
FIG. 6(a) illustrates an example of a system with a logically distributed architecture, according to one embodiment.

FIG. 6(a) illustrates an example of a system with a logically distributed architecture, according to one embodiment of the invention. In the logically distributed architecture example, the base stations (also known as eNodeBs or eNBs in LTE) could be physically located at the cell sites, or the eNBs could be co-located (for example in a BTS hotel). In the former case, the eNBs are typically able to communicate with each other by an Internet Protocol (IP) network. In the latter case it is also possible that the eNBs areinterconnected by a suitable interconnecting network or fabric, for example Serial Rapid IO (also known as sRIO) or Gigabit Ethernet or the like. In the example of FIG. 6(a), each of cell 1, cell 2, and cell 3 comprise a local muting adapter 600. For each candidate hypothesis change and/or resource, each cell can calculate its own benefit metric, and each cell can communicate its benefit (or penalty, as the case may be) to other cells. Thus, in the example of FIG. 6(a), each cell (or eNB) calculates its own benefit metric, and obtains the benefit/penalty metrics reported by other cells over an interface. This information exchange between the cells facilitates a distributed determination of the best muting hypothesis. For example, a cell or eNB can make its determination of its own On/Off state (or the On/Off state of other cells) based on the information it has received from other cells or eNBs and the information it locally has.

In general, benefit metrics indicate a benefit obtained by a benefitting cell/eNB in the event that another cell/eNB mutes a certain physical-resource-block (PRB). However, benefit metrics generally cannot explicitly indicate an importance of a benefit metric like, for example, how important a channel is, which will profit from the muting of a PRB by another eNB. For example, the indicated importance should be different depending on whether the channel that profits from the muting of a PRB is intended to be used for data, control information, or system information broadcasting. But benefit metrics generally have no way to explicitly signal why a channel and the related benefit metric is specifically important.

In addition to utilizing benefit metrics, embodiments of the present invention can also utilize penalty metrics. The penalty metrics can indicate a penalty obtained by a penalized cell/eNB in the event that the cell/eNB mutes a certain physical-resource-block (PRB), or in the event that another cell/eNB unmutes a certain PRB. Although benefit metrics are described in detail below, similar principles can be applicable to penalty metrics as well.

An implicit way to indicate an increased importance of an intended protected channel is to allow a benefitting eNB to increase the value of the benefit metric. For example, if a channel is an important channel (such as a control channel, for example) the eNB may increase a corresponding benefit metric value to indicate that the channel is important. However, one shortcoming with this approach is that a benefitting cell/eNB generally determines an importance of a channel using an implementation-specific manner, and thus the determined importance may vary because different eNB vendors may use different algorithms. If the receiving eNB has a different way of understanding the priority of the same channel, the benefit metric may be misunderstood.

For example, a benefitting cell can determine a benefit metric to be 0.7 from Channel-Quality Information (CQI), but, if the PRB is going to be used for a control channel, the benefitting cell can report the benefit metric as 0.9 to show its importance.

However, when another receiving eNB receives such a benefit metric from the benefitting eNB, the receiving eNB may consider the data channel as a normal data channel. Even if the benefit metric is high, the receiving eNB may still decide to not mute the data channel because the PRB may be considered to be not important by the receiving eNB.

Embodiments of the present invention are directed to a benefit metric and a priority factor that can be transmitted between two base stations/access nodes (e.g., eNBs), for example, via X2 signaling to support inter-eNB coordinated multi-point (CoMP). The benefit metric may be calculated using the CSI (channel status information), and a priority factor may be used to quantify the importance of this benefit metric. The benefit metric corresponding to a control channel or a system information block can indicate greater importance as compared to a benefit metric corresponding to a normal data channel. In order to indicate the greater importance, the eNB could associate a higher priority factor with the benefit metric.

In embodiments of the present invention, a signalling design can include a benefit metric and a priority factor in a same message. For example, in one embodiment, a benefit metric can be interpreted as a set (M, N), where M is a normal benefit metric calculated by, for example, CSI, and N is an adjusting factor corresponding to a priority factor. Upon receiving the benefit metric, an eNB can use the M and N jointly to determine whether muting should be performed.

The detailed algorithms for actually determining whether muting should be performed can be implementation-specific.

The priority factor, N, for a given type of control channel (such as, for example, an enhanced Physical Downlink Control Channel (ePDCCH) or a PDCCH) can be dynamically modified based on various factors. For example, the priority factor can be modified based on a congestion of a PDCCH/ePDCCH control channel, a use of range extension, and/or Quality-of-Service characteristics of a data channel transmission. Different channel types can include data or control channels, or different types of control or different types of data channels, or any other different types of channels. Examples of different channel types may include Physical Downlink Shared Channel (PDSCH), or Physical Downlink Control Channel (PDCCH), or enhanced Physical Downlink Control Channel (ePDCCH), or any other different types of channels. With respect to congestion of the PDCCH/ePDCCH control channel, the priority factor could be set at a higher value if the PDCCH/ePDCCH of the reporting cell is getting congested because muting in that case is more important. With respect to a use of range extension, the priority factor may be set to a higher value if range extension is being used in the reporting cell. In this case, the control channel may need protection if the control channel is being sent to range-extended UEs, and so muting should take a higher priority. With respect to Quality-of-Service (QoS) characteristics of the data channel (such as a PDSCH) transmission for which the control channel is indicating the allocation, if the data bearer (such as a PDSCH) is delay sensitive, then, without muting, the PDCCH of the UE may have high error rates and may result in a missed deadline. So, muting to protect ePDCCH may be more important, thus the priority factor can indicate a higher value.

In one embodiment, the signaling for the priority metric can be performed independently of the signaling of the benefit metric. In another embodiment, the signaling for the priority metric can be performed jointly with the signaling of the benefit metric. FIG. 6(b) illustrates options for signaling a priority metric. In either case, in embodiments of the present invention, the receiving eNB can use both the priority-metric and the benefit-metric to determine its response. If the priority metric is signaled separately from the benefit-metric, the priority metric can be changed at a much longer time-scale than the benefit-metric. For example, the priority metric can be changed by pre-negotiation between two eNBs.

Figure 7:
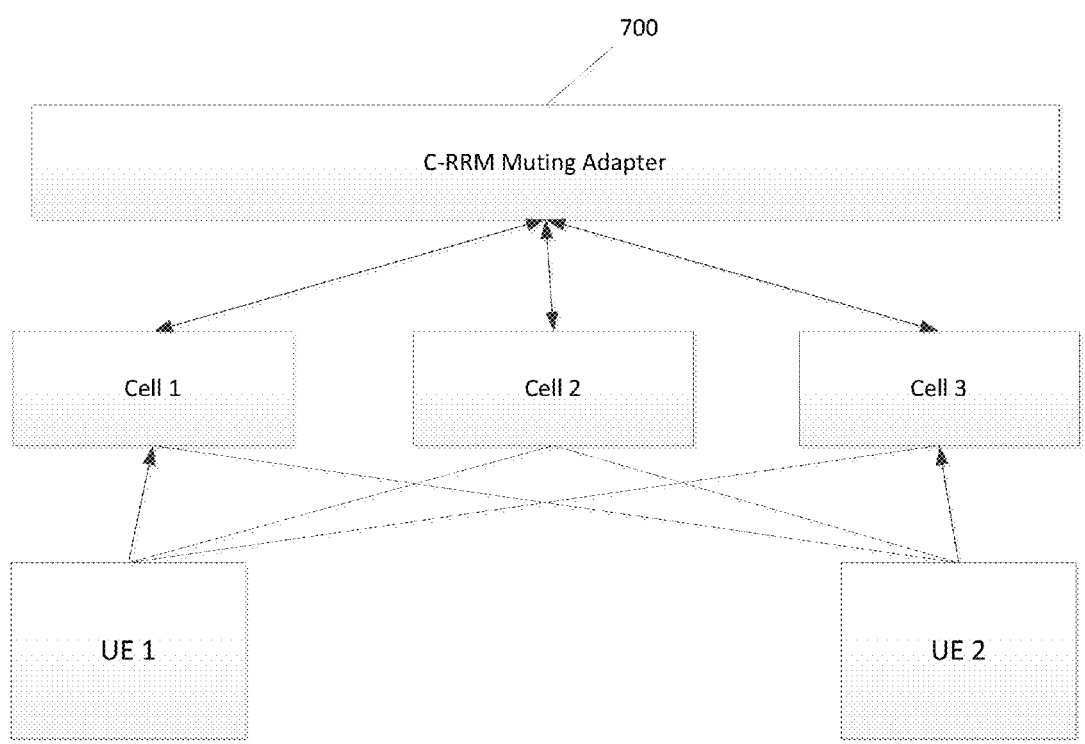
FIG. 7 illustrates an example of a system with a logically centralized architecture including a centralized radio resource management (C-RRM), according to an embodiment.

FIG. 7 illustrates an example of a system with a logically centralized architecture including a centralized radio resource management (C-RRM) network element 700. In the example of FIG. 7, each of cell 1, cell 2, and cell 3 reports its benefit and penalty metric on various candidate hypothesis/resources to the C-RRM. The C-RRM may then make the determination of hypothesis change and resource, and communicate the result of the determination back to the cells.

Figure 8:
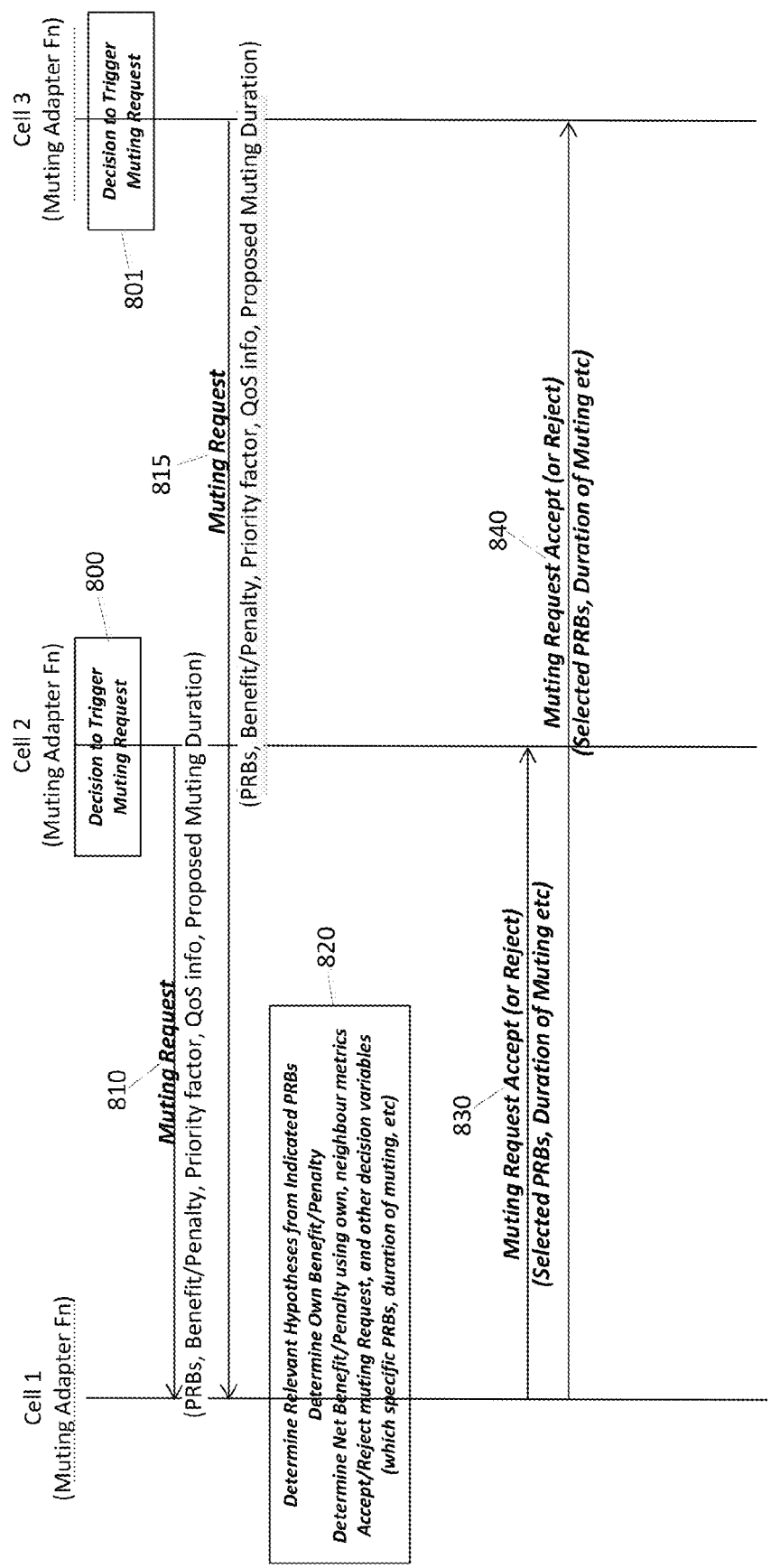
FIG. 8 illustrates an example of a signaling diagram, according to one embodiment.

FIG. 8 illustrates an example of a signaling diagram in which cell 2 and cell 3 want to use a certain PRB and want cell 1 to mute that PRB, according to an embodiment. As illustrated in the example of FIG. 8, cell 2 makes a decision to trigger a muting request at 800 and cell 3 similarly makes a decision to trigger a muting request at 801. Cell 2 transmits, at 810, a muting request to cell 1, and cell 3 transmits, at 815, a muting request to cell 1. The muting request(s) may comprise the PRBs, benefit metric information, other QoS information, and proposed muting duration. At 820, cell 1 determines the relevant hypotheses from the indicated PRBs, determines its own benefit/penalty, determines the net benefit/penalty using its own and neighbor benefit/penalty, duration of muting, and other decision variables, etc. Then, at 830, cell 1 transmits a muting request accept (or reject) to cell 2, and transmits, at 840, a muting request accept (or reject) to cell 3.

Figure 9:
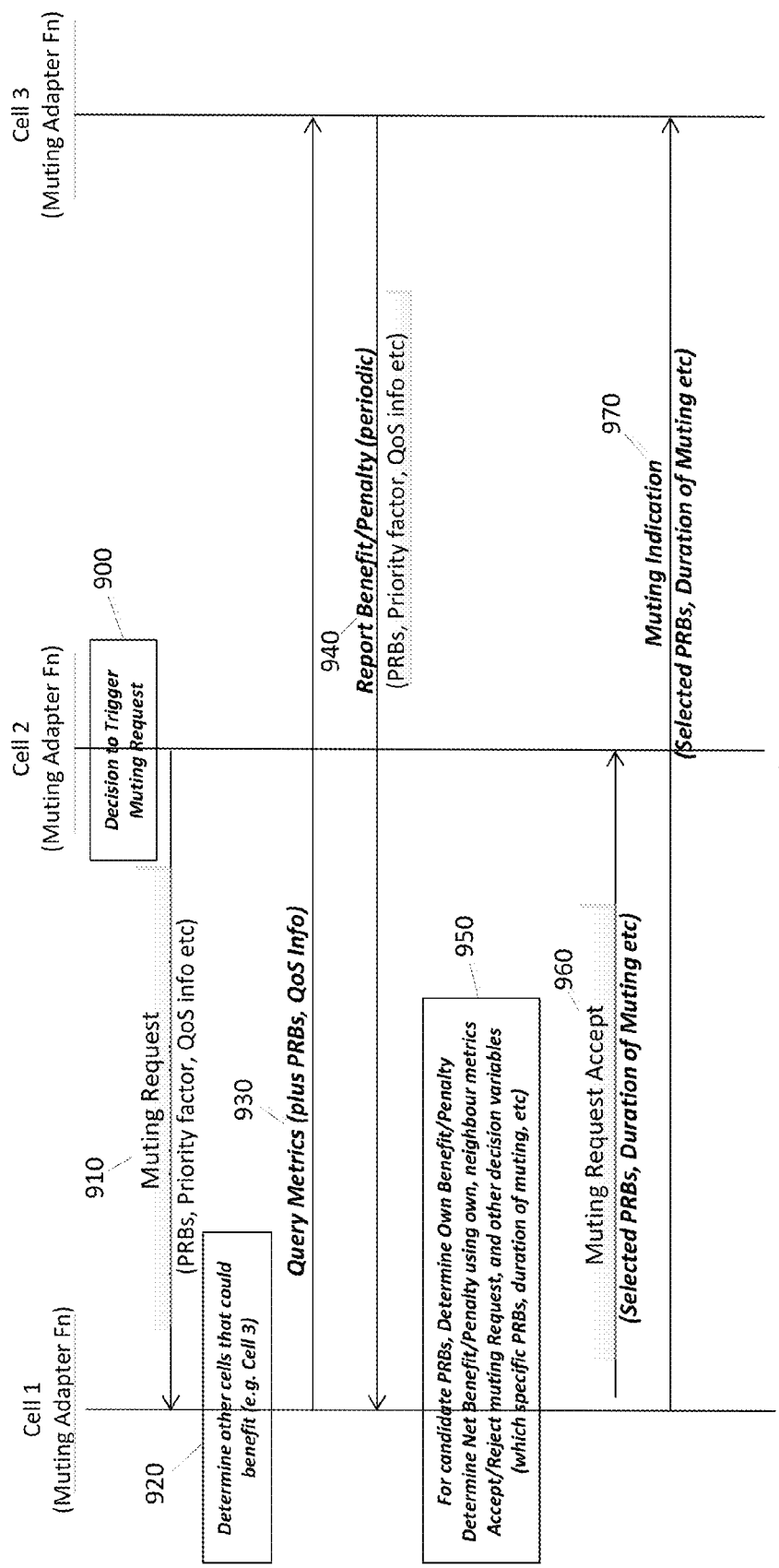
FIG. 9 illustrates an example of a signaling diagram, according to another embodiment.

FIG. 9 illustrates an example embodiment of a signaling diagram in which cell 2 wants to use a certain PRB and wants cell 1 to mute that PRB, where it is known that cell 3 will also benefit. As illustrated in the example of FIG. 9, cell 2 makes a decision to trigger a muting request at 900. Cell 2 then reports benefit metrics to cell 1, at 910, for example as part of the muting request. Cell 1 may then determine other cells that could benefit (e.g., cell 3), at 920. Cell 1, at 930, may query the benefit metrics from cell 3. At 940, cell 3 reports the benefit metrics to cell 1. For candidate PRBs, cell 1 may determine its own penalty metrics, determine the net benefit/penalty metrics using its own and neighbor benefit/penalty metrics and other decision variables, at 950. If the net benefit taking into account the penalty to Cell 1 and the benefits to the other cells is sufficiently large (or positive), Cell 1 may decide to accept the muting request. In that case, Cell 1 transmits a Muting Request Accept message to cell 2 at 960, and transmits a Muting Indication message to cell 3 at 970.

Figure 10:
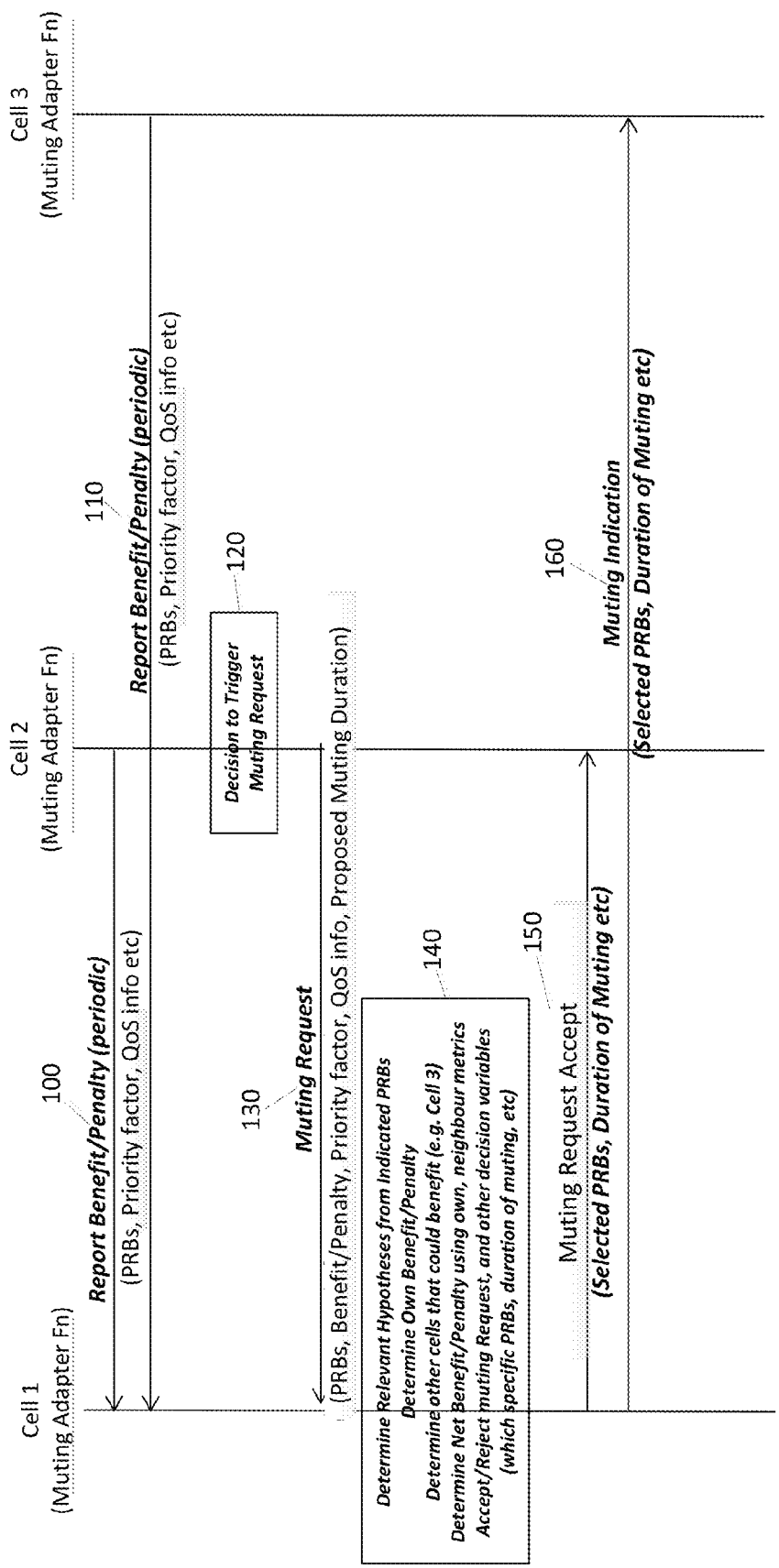
FIG. 10 illustrates an example of a signaling diagram, according to another embodiment.

FIG. 10 illustrates another example embodiment of a signaling diagram in which cell 2 wants to use a certain PRB and wants cell 1 to mute that PRB, where it is known that cell 3 will also benefit. In this example, cell 2 periodically reports benefit/penalty metrics to cell 1, at 100, and cell 3 periodically reports the benefit/penalty metrics to cell 1, at 110. Cell 2 makes a decision to trigger a muting request at 120, and transmits a muting request to cell 1 at 130. The muting request(s) may comprise the PRBs, benefit metric information, other QoS information, and proposed muting duration. Although, in this example, cell 3 does not initiate a muting request, cell 3 may also benefit from cell 1 muting. Due to the periodic reports, cell 1 knows of cell 3's potential benefit and can factor that into its decision without having to explicitly query cell 3. At 140, cell 1 determines the relevant hypotheses from the indicated PRBs, determines its own penalty, determines the net benefit/penalty using its own and neighbor benefit/penalty, duration of muting, and other decision variables, etc. At 150, cell 1 transmits a Muting Request Accept message indicating including the selected PRBs, duration of muting, etc. to cell 2. At 160, cell 1 transmits a Muting Indication message indicating including the selected PRBs, duration of muting, etc. to cell 3.

Figure 11:
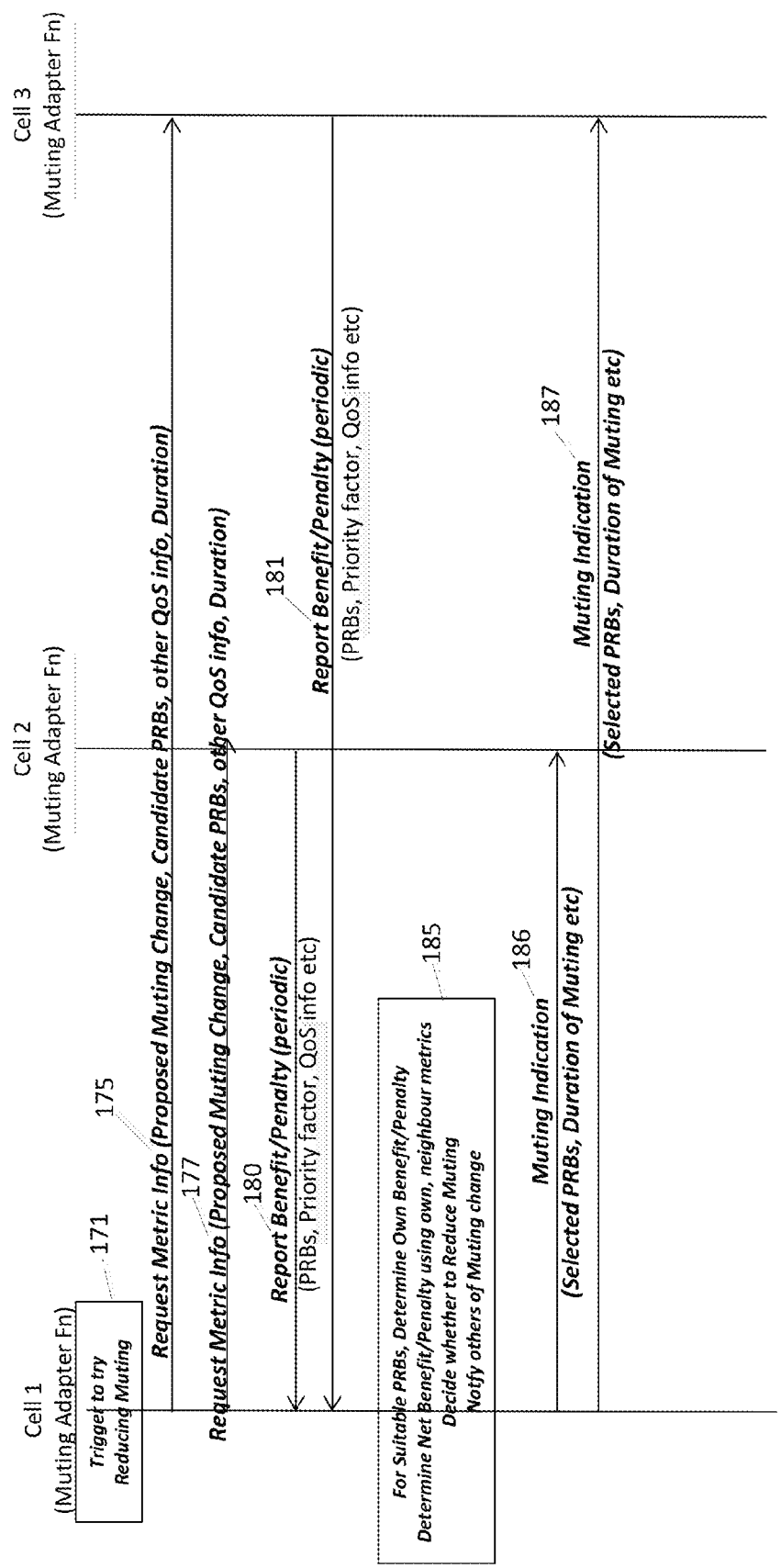
FIG. 11 illustrates an example of a signaling diagram, according to another embodiment.

FIG. 11 illustrates an example of a signaling diagram in which cell 1 wants to reduce its muting, for example, because it has an increase in load, but cells 2 and 3 will also be affected. In the example of FIG. 11, at 171, cell 1 triggers to try to reduce muting. At 175, cell 1 sends a metric information request to cell 3 and, at 177, requests metric information from cell 2. The metric information request may comprise the proposed muting change, candidate PRBs, other QoS information, and duration. At 180, cell 2 reports its penalty metrics to cell 1 and, at 181, cell 3 reports its penalty metrics to cell 1. For suitable PRBs, cell 1 may determine its own benefit metrics, determine the net benefit/penalty metrics using its own and neighbor benefit/penalty metrics and decide whether to reduce muting, at 185. At 186, cell 1 transmits a Muting Indication message indicating including the selected PRBs, duration of muting, etc. to cell 2. Similarly, at 187, cell 1 transmits a Muting Indication message indicating including the selected PRBs, duration of muting, etc. to cell 3.

Figure 12A:
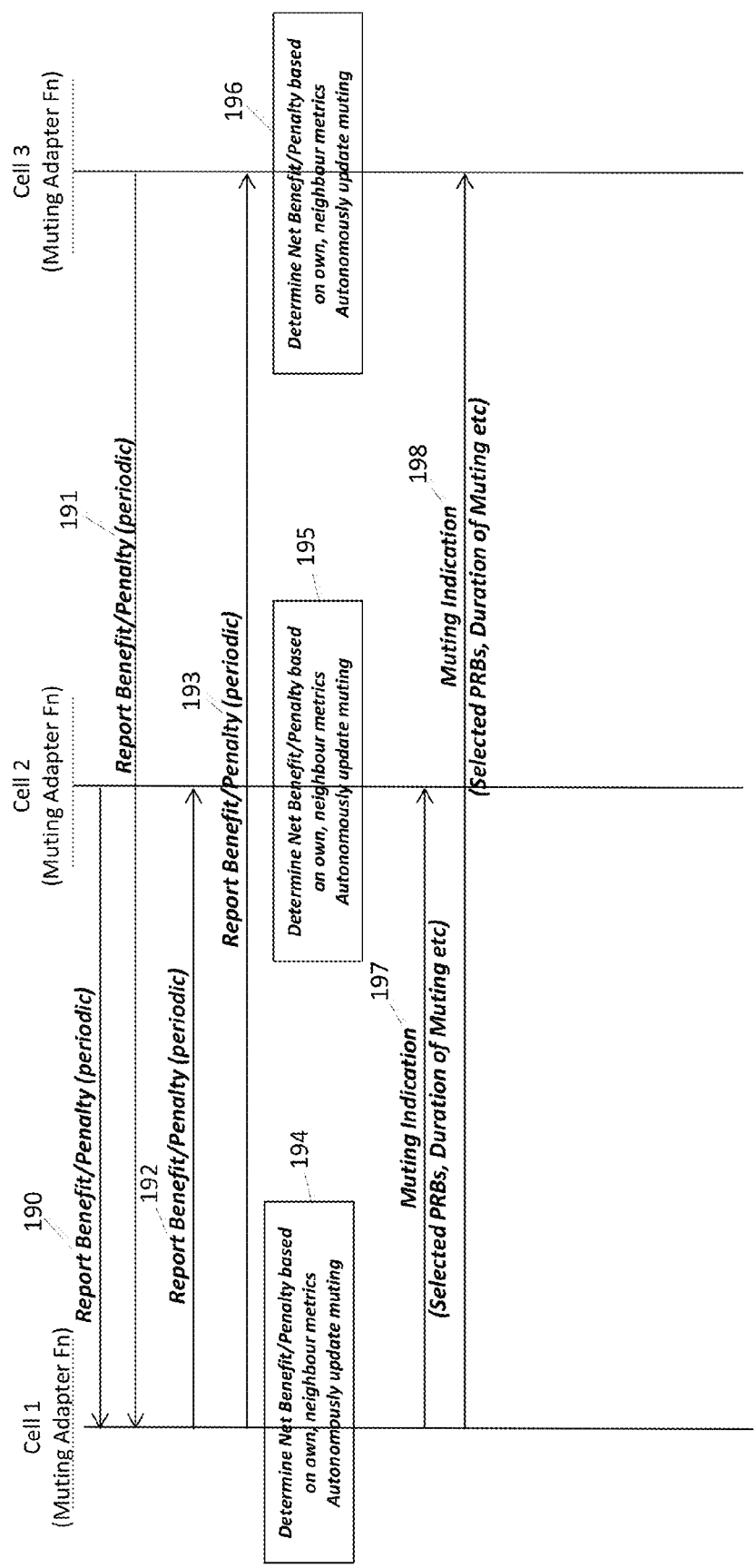
FIG. 12a illustrates an example of a signaling diagram, according to another embodiment.

FIG. 12*a* illustrates an example of a signaling diagram in which there are no explicit requests for increasing or decreasing muting. Rather, in the example of FIG. 12*a*, each cell autonomously makes adjustments. In this embodiment, cells periodically exchange benefit/penalty information with neighbors. For example, as illustrated in FIG. 12*a*, cell 2 periodically reports benefit/penalty information to cell 1 at 190. Cell 3 periodically reports benefit/penalty information to cell 1 at 191. Cell 1 similarly periodically reports its benefit/penalty information to cells 2 and 3 at 192, 193. At 194, 195, and 196, each of cells 1, 2, and 3 determines the net benefit/penalty metrics using its own and other cells' benefit/penalty metrics and autonomously updates muting. At 197, cell 1 transmits a Muting Indication message indicating including the selected PRBs, duration of muting, etc. to cell 2. Similarly, at 198, cell 1 transmits a Muting Indication message indicating including the selected PRBs, duration of muting, etc. to cell 3. It may be noted that it is not necessary that the determination of the net benefit/penalty and consequent update of the muting (or selection of muting hypothesis) by cell 1 need not happen at exactly the same time as the corresponding determination by cell 2 or cell 3. That is, the determination by each cell can proceed asynchronously from the other cells. Thus a cell can decide the timing at which it will do its computation of net benefit/penalty and muting update separately from the time at which other cells make their own such determination. Further, a cell need not do its computation of net benefit/penalty and muting update as soon as it receives the benefit/penalty metrics from one or more neighbors, but may choose its own suitable time to do these operations. At the time a cell executes determination of its muting update (or muting hypothesis selection), it may use whatever information it has received from other cells up to that point from other cells. In some embodiments, when a cell determines its updated muting, it can send a Muting Indication message to the other cells to notify them of its decision to change its muting.

Figure 12B:
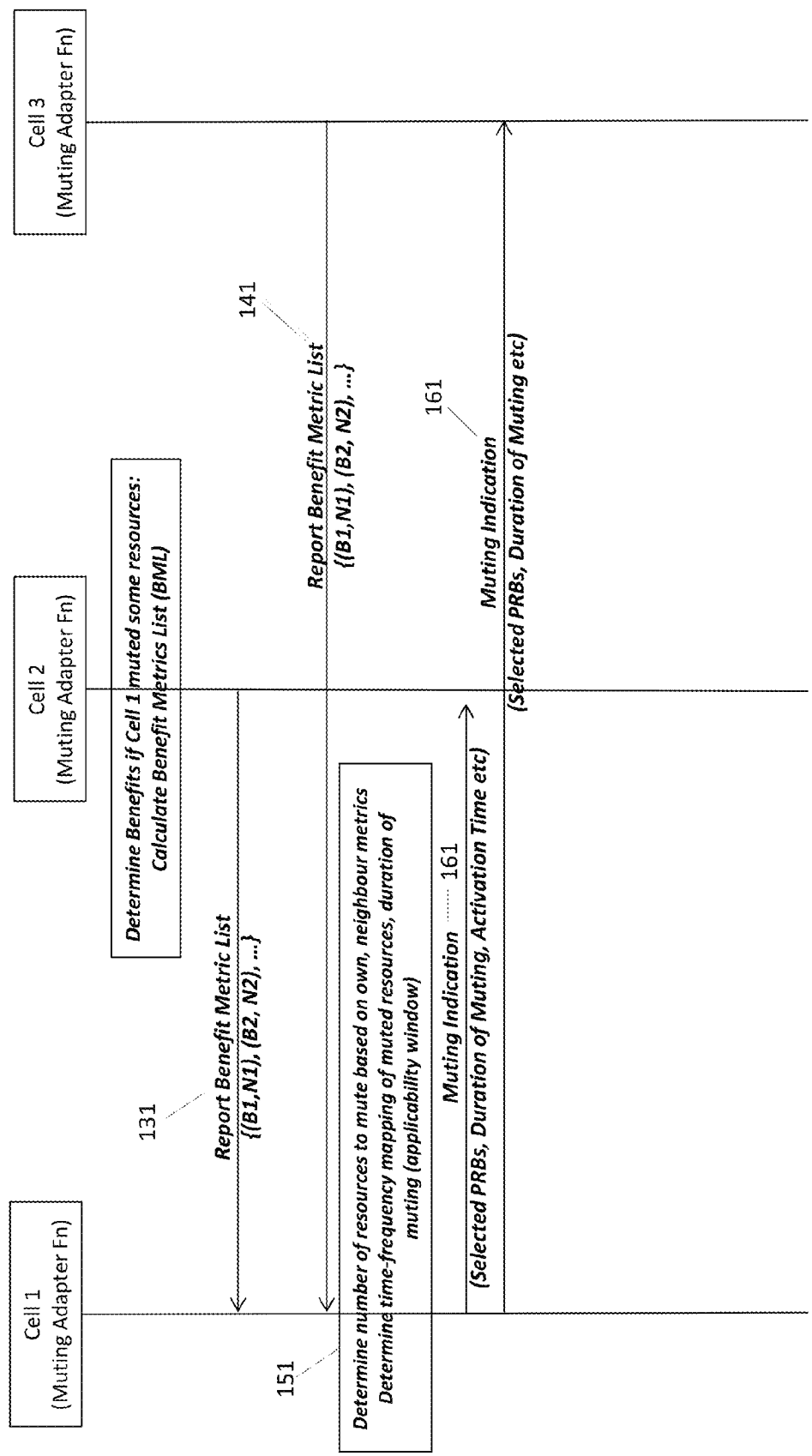
FIG. 12b illustrates an example of a signaling diagram, according to another embodiment.

Rather than starting with a current muting hypothesis and issuing a Muting Request to modify it to another muting hypothesis h2 as in some of the above embodiments, some embodiments take the approach wherein a given cell determines how many resources it should mute. FIG. 12*b* illustrates a signaling diagram according to an embodiment. At 131, cell 2 transmits an indication of the benefit it would receive if cell 1 were to mute a certain amount of resources. This indication may be transmitted in the form of a Benefits Metric List (BML). An example form of this is the following: {(B1, N1), (B2, N2), (B3, N3), ... }, where the elements may be typically in a certain order. Here, the first element (B1, N1) of the list denotes that cell 2 can receive a benefit of B1 per additional resource if cell 1 were to mute an additional fraction of resources N1. The next element (B2, N2) indicates that cell 2 can receive a further benefit of B2 per additional resource if cell 1 were to mute an additional amount of fraction N2. Similarly, each successive element (Bi, Ni) in the list indicates that cell 2 can receive a further benefit of Bi per additional resource if cell 1 were to mute an additional fraction of resources Ni. Typically, the benefit per resource may reduce as more and more muted resources are provided, an indication of diminishing returns. The benefit metric Bi may be calculated using any of the methods outlined herein. The number of elements in the list may be suitably chosen. For example, a sufficient number of elements may be indicated in the list such that the total fraction of indicated resources adds up to some desired target, or until such point as the benefit per resource diminishes by a suitable amount. In FIG. 12*b*, cell 3 can also provide a similar indication of its benefit if cell 1 were to mute, using its own Benefit Metric List, as shown at 141. Cell 1 can then make a determination of the appropriate amount of muting, considering the Benefit Metric Lists received from Cell 2 and Cell 3, as shown at 151. At 161, Cell 1 can transmit a Muting Indication to Cell 2 (and/or Cell 3) indicating its decision on muting.

Figure 22:
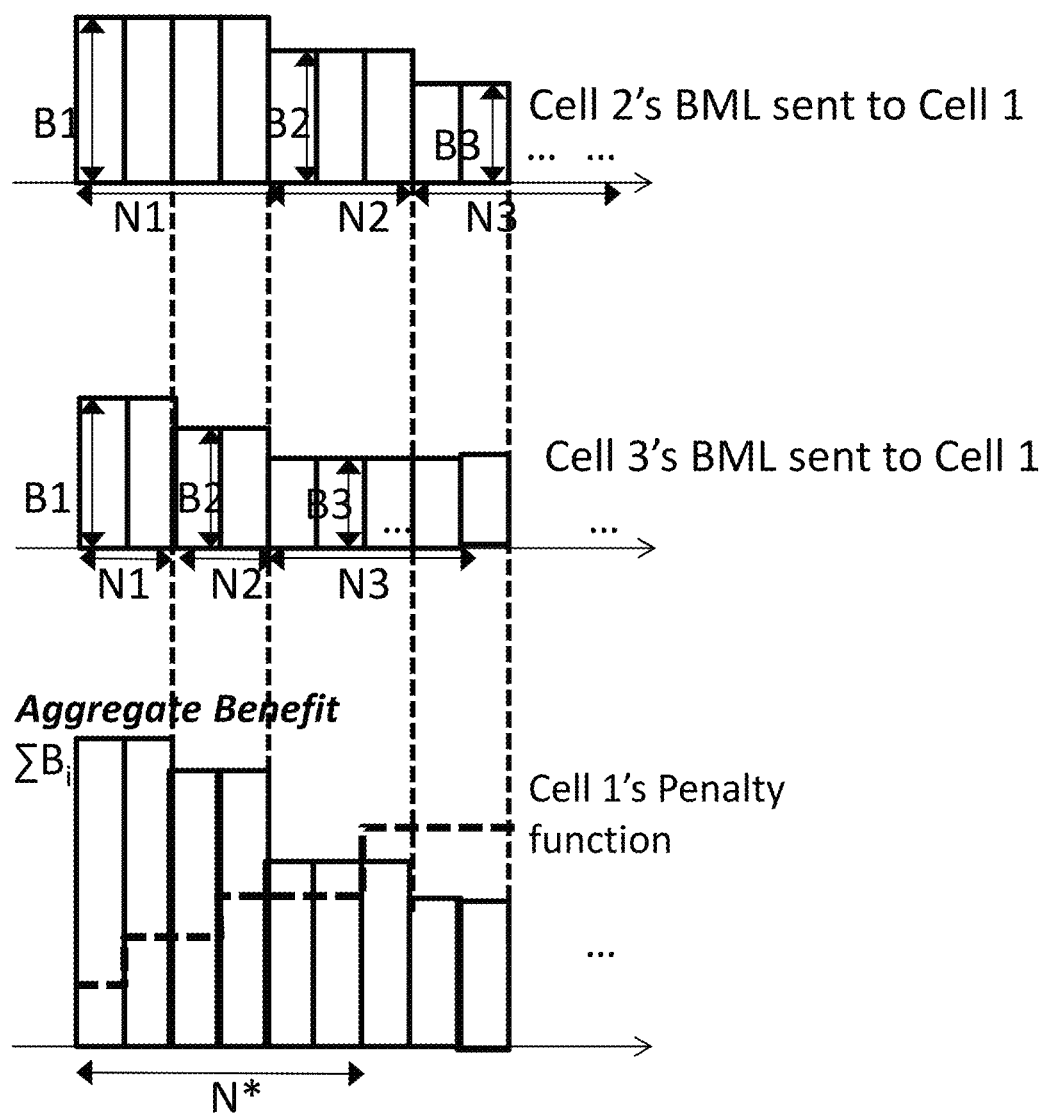
FIG. 22 illustrates a diagram depicting an example way in which Cell 1 may determine the appropriate amount of muting, according to an embodiment.

FIG. 22 illustrates an embodiment of a way in which Cell 1 may determine the appropriate amount of muting. Cell 1 can construct an aggregate function, $\Sigma B_i$ representing the aggregate benefit to Cells 2, 3, and any other cells that may have similarly provided Benefit Metric Lists to Cell 1. Correspondingly, Cell 1 may incur a penalty for muting some resources. Typically, the penalty per muted resource incurred by Cell 1 would be a non-decreasing function of the fraction of resources muted by Cell 1. Cell 1 would choose to mute a fraction of resources N* up to which the aggregate benefit $\Sigma B_i$ outweighs the penalty incurred by Cell 1.

In some embodiments, the Benefits Metric List may further contain an indication of a Quality of Service (QoS) class, such as an identifier or a weight. Similarly, Cell 1 may associate a QoS class or a weight with its own penalty in determining the amount of muting. In an embodiment, Cell 1 may use such an indication, for example, in determining whether the benefit to the other cells is for a higher QoS than its own penalty. If so, then Cell 1 may consider it beneficial to mute since the benefit to a higher QoS would outweigh a penalty to a lower QoS. In another embodiment, Cell 1 may take a weighted difference of the aggregate benefit to other cells and its own penalty using the weights, rather than a simple difference, and determine the optimal amount of muting N* to be the point up to which the weighted difference is positive.

In one embodiment, the benefit and penalty metrics may be calculated based on the "achievable Proportionally Fair (PF) metric." This approach may be suitable when the muting adaptation is targeted to non-GBR users (possibly with different QoS classes within non-GBR). Here, the term GBR stands for 'Guaranteed Bit Rate', a quality of service class in which the eNB guarantees a certain bit-rate to a user or bearer or flow. Conversely, non-GBR refers to a quality of service class in which there are no explicit guarantees as to the bit-rate that a user device can receive. Rather, the eNB makes a determination of resource allocation among the user devices based on various criteria such as the channel state information (CSI) of the user devices, the throughputs that the user devices have achieved in the past, scheduling weights representing the quality of service (QoS) class for the user or bearer flow, and considerations of overall fairness and efficiency. The Proportionally Fair (PF) scheduling algorithm is one such algorithm typically used by the eNB to ensure that the distribution of resources allocated to the different users meets a certain fairness criterion known as proportional fairness. The PF metric is a metric that can be computed by the eNB when using the Proportionally Fair scheduling algorithm or a variation thereof. The PF metric represents the gradient of a "utility function". When a certain amount of resources used in a given interference hypothesis h are increased by $\Delta\rho$, the net change in the "utility function value" of a cell can be represented as (Gradient of Utility Function)*$(\Delta\rho)$. The PF metric of a cell c may be used as the function Uc( ) in the above description. In some embodiments, a weighted PF metric may be used, for example wherein weights are used to represent the Quality of Service (QoS) weight corresponding to the QoS class of users' data flows.

According to this embodiment, the utility of a cell c under a given interference hypothesis c can be calculated as follows based on the PF metric: $Uc(h)=\max_u [w_u Rc,h(u)/T(u)]$ (i.e., the maximum weighted PF metric among the relevant users in cell c relative to interference hypothesis h). The relevant users may be a specific single user, a subset of users (or possibly even all users) in the cell eligible to be scheduled on the proposed resources, and/or users for which the spectral efficiency under that hypothesis h relative to a baseline hypothesis h0 is greater than a threshold: $Rc,h(u)/Rc,h0(u) > $ Threshold. The $w_u$ represents a QoS weight of the user, for example the sum of QoS weights of the bearers of the user under consideration. For "generalized PF metric" with a fairness factor β, $Uc(h)=\max_u [w_u Rc,h(u)/T^\beta(u)]$. The $Rc,h(u)$ term represents the spectral efficiency achievable by the user on the set of resources when served by cell c under the interference hypothesis h. For instance, if N PRBs are being considered, this can be calculated as the TBS achievable by the user over the N PRBs under the particular combination of On/Off of the interferers.

The above calculation of $Uc(h)$ (and correspondingly $Rc,h(u)$) can be done for a specific set of resources, or averaged over all the resources. Using this calculation of $Uc(h)$, the benefit or penalty $Uc(h2)-Uc(h1)$ may then be calculated. As noted earlier, the benefit or penalty may be expressed relative to a reference hypothesis h0, such as the muting hypothesis wherein all relevant cells in the coordinating cluster may be in the On state. In terms of notation, we may use PF' to denote the achieved (weighted and generalized) PF metric when a particular muting hypothesis is used, and PF to denote the achieved (weighted and generalized) PF metric under the reference muting hypothesis h0. The benefit of using a given hypothesis h2 may then be expressed relative to the reference hypothesis h0 as PF'(h2)−PF(h0), or simply PF'−PF.

Instead of using the maximum in the above calculation of the utility, certain embodiments can take an average of top K of the relevant users. In addition, the PF metric-based utility used above can be filtered or averaged over time, or taken from the immediately previous TTI.

In another embodiment, the benefit and penalty metrics can be calculated based on the achievable spectral efficiency. This approach can be used with both GBR and non-GBR traffic. According to this embodiment, the "utility" of a cell c under hypothesis h can be calculated as: $Uc(h)=\max_u [f(w_u (Rc,h(u)))]$, where the max is over the relevant users in cell c relative to the given interference hypothesis, and where f( ) is some monotonic increasing function. In a typical example: f(x)=x—corresponds to the max spectral efficiency. The relevant users may be a specific single user, or a subset of users (or possibly even all users) in the cell eligible to be scheduled on the proposed resources. The $w_u$ represents a QoS weight of the user, for example, the sum of QoS weights of the bearers of the user under consideration. The $Rc,h(u)$ term represents the spectral efficiency achievable by the user on the set of resources when served by cell c under the interference hypothesis h. For example, if N PRBs are being considered, this can be calculated as the TBS achievable by the user over the N PRBs under the particular combination of On/Off of the interferers.

According to certain embodiments, the above calculation of $Uc(h)$ (and correspondingly $Rc,h(u)$) can be done for a specific set of resources, or averaged over all the resources. Using this calculation of $Uc(h)$, the benefit or penalty $Uc(h2)-Uc(h1)$ can be calculated.

Instead of using the maximum in the above calculation of the utility, certain embodiments can take an average of top K of the relevant users. In addition, the spectral efficiency-based utility used above can be filtered or averaged over time, or taken from the immediately previous TTI.

According to another embodiment, the benefit and penalty metrics may be calculated based on the number of users competing for resources (i.e., eligible users) and the number of available resources. Thus, if there are E eligible users and A available resources under a given hypothesis, then $Uc(h)$ can be calculated as E/A. When the hypothesis is changed from h1 to h2, this will result in a change in the available resources from A1 to A2. Accordingly, the net change in utility can be represented as: $Uc(h2)-Uc(h1)=\Sigma*(1/A2-1/A1)$.

In certain embodiments, instead of number of eligible users E, the sum of weights of the eligible bearers W may be used. As a result, the net benefit or penalty could be $W*(1/A2-1/A1)$. The eligible users (or eligible bearers) may be the users (or bearers) that have data in the buffer, or a subset of the users that have data in the buffer. For example, the eligible users may be a set of users that are likely to get scheduled on the specific resources corresponding to a specific hypothesis.

The available resources may be, for example, time-frequency resources (e.g., PRBs) available for non-GBR traffic or time-frequency resources available for non-GBR traffic under a specific hypothesis. It should be noted that the above quantities could be filtered or averaged over time, or instantaneous values can be taken, for example, in the immediately previous TTI.

According to yet another embodiment, a combination of the metrics used in the embodiments discussed above may also be applied. For example, as in the embodiment where the benefit and penalty metrics are calculated based on the achievable PF metric, the utility of a cell c may be defined as $Uc,PF(h)=\max_u [w_u Rc,h(u)/T(u)]$, and $Uc,SumW(h)=E/A$ as in the embodiment that utilizes eligible users and number of available resources. A combined metric may then be defined as $Uc(h)=\min(Uc,PF(h), E/A, Max\_value)$, where $Max\_value$ is used to restrict the metric to some convenient upper bound. Further variations are possible, such as restricting the calculation of the max in $Uc,PF(h)$ to only users whose flows have been ongoing for a sufficiently long duration.

According to some embodiments, the benefit and penalty metrics of a cell may be based on the condition of some specific users, rather than to the overall resource allocation across all users in the cell. For example, as a variation of the embodiment where the benefit and penalty metrics are calculated based on the achievable PF metric, the utility of a cell c under a given interference hypothesis c can be calculated as follows based on PF metric: $Uc(h)=w_u Rc,h(u)/T(u)$, for some specific user u rather than as the max over all users. As another example, as a variation of the embodiment where the benefit and penalty metrics are calculated based on the achievable spectral efficiency, the utility of a cell c under a given interference hypothesis c can be calculated as follows based on its achievable spectral efficiency: $Uc(h)=f(w_u (Rc,h(u)))$, for some specific user u rather than as the max over all users. The user u for this calculation may be identified by various criteria. For example, the user may have a sufficiently large gain in spectral efficiency (or SINR) with respect to the hypotheses under consideration: $Rc,h2(u)/Rc,h1(u) > $ threshold, wherein the threshold may be dependent on the number of neighbors that need to be muted in order to get the spectral efficiency or SINR gain. Alternatively, the user may be achieving a bit-rate less than some nominal bit-rate or guaranteed bit-rate, etc.

According to another embodiment, the benefit and penalty metrics of a cell may be based on the ability to meet GBR or delay targets of the users in the cell. For instance, it may be based on the difference between actual throughput of a user and the desired GBR target throughput, or the difference between the actual delay experienced by a user and the delay target. For example, the metric may be based on $wu*[\max(0,(TGBR(u)-T(u))]\alpha$, where $T(u)$ is the actual throughput of a GBR user u and TGBR is the target GBR rate of the user. Alternatively, the metric may be based on $wu*[Dmax(u)-D(u))]\alpha$, where $Dmax(u)$ is the max tolerable delay (i.e., delay target) of a user u, and $D(u)$ is the currently experienced delay of packets for the user. In yet another alternative, the benefit and penalty metrics may be defined in terms of the PRB utilization of the cell, for example based on $(1-\rho)\alpha$ where $\rho$ is the fraction of PRBs used in the cell, and $\alpha$ is a parameter (possibly a negative value in this case). In particular, $\rho$ may refer to the fraction of PRBs used for GBR and signaling.

In another embodiment, the benefit metric of a given cell under a given hypothesis h may be calculated as follows. This is typically targeted at GBR data flows. If the cell is able to ensure that a user u can meet its GBR target throughput (or other measures such as delay), the cell may accrue a payoff value of $V(u)$. The value $V(u)$ may be a constant, or may depend on factors such as the delay target of the flow, the QoS class of the flow, or the GBR target value. Suppose the fraction of resources needed to enable user u to reach its target GBR rate is $N(u)$. $N(u)$ will typically depend on the muting hypothesis, since the interference experienced under the muting hypothesis will influence the spectral efficiency achieved by the user. Then the utility for the cell due to enabling user u to meet its target GBR rate can be expressed as $V(u)/N(u)$. Thus when changing from hypothesis h1 to h2, the benefit obtained by a cell can be expressed as $V(u;h2)/N(u;h2)-V(u;h1)/N(u;h1)$. As noted earlier, in some embodiments, the benefit can be expressed relative to a reference muting hypothesis h0, such as the muting hypothesis in which all cells are in the On state. In this case, the benefit would be expressed as $V(u;h2)/N(u;h2)-V(u;h0)/N(u;h0)$.

According to certain embodiments, the muting adaptation method may be used in conjunction with a mute first, schedule next (MFSN) scheme. General characteristics of MFSN schemes comprise the muting patterns and their changes not being tied to the scheduling of specific users in specific TTIs. Thus, the muting is decided first and then scheduling takes place with knowledge of the muting. Each cell starts with muting in a pre-defined time-frequency resource region. The patterns of muted time-frequency resources between neighbors are staggered/arranged in a way to allow maximal benefit of each cell's muting to its neighbors. Decisions to modify the muting are made periodically, or on some event trigger such as the onset of congestion/overload, or an inability to meet QoS, etc. The "growth" or "contraction" of the muting region of each cell at each adaptation occasion can follow a pre-defined pattern, so as to maximize continuity with the previous muting region.

General benefits of MFSN schemes comprise the CQI estimation by each UE on a sub-band basis will automatically reflect the muting pattern of its strong interferers—subband CQI of each UE will indicate good CQI on low-interference subbands. Thus, the channel-aware scheduler will make scheduling decisions that implicitly account for the best interference subbands for each UE.

According to this embodiment as used in conjunction with MFSN schemes, at each muting adaptation decision point, one or more cells can be picked to modify their muting patterns (grow or shrink) taking into account the benefit and penalty to each cell. The added or subtracted muted resources will typically follow a predefined time-frequency order. The hypotheses h1 and h2 corresponding to a given candidate cell's expansion (or contraction) of muting can be inferred from the added (or subtracted) muted resources in the predefined time-frequency order. As described above, the calculation of the benefit and penalty metrics can be based on the specific resources to be added (or subtracted) or just based on the number of muted resources, based on specific subsets of UEs which are more likely to make use of the added resources or based on sum/average across all UEs, and/or based on the PF metric or on the sum of weights per available PRB.

Although the above embodiment described an instantiation of muting in frequency domain, it is also possible to instantiate it in time domain, or in a combination of time and frequency domain. In time domain, measurement restrictions can be used, where UEs are allowed to report separate measurements for different subsets of subframes. Thus, one can have a muting instantiation of one form in frequency domain within one subset of subframes, and a different muting instantiation in frequency domain within another subset of subframes. As a result, the set of hypotheses that exist within each subset of subframes may be different. By configuring measurement restriction subsets for the UEs appropriately, measurements can be obtained that correspond to each set of muting hypotheses within each subset of subframes. This can be taken into account when adapting the muting. For example, a change in muting may be made only within one subset of subframes. This helps to achieve finer granularities of the muting, rather than having to do it every subframe, or having to do it at the granularity of sub-bands, etc.

According to another embodiment, instantiation may be performed in a schedule first, mute next (SFMN) scheme. General characteristics of SFMN schemes comprise the muting patterns and their changes typically being based on the scheduling of specific users in specific TTIs. Thus, the scheduling is decided first (either based on assuming no muting at all, or based on the current muting) and a new muting (either completely new muting, or a growth or contraction of existing muting,) is determined with knowledge of the scheduling. Each cell may determine an assignment of frequency (and maybe time) resources to users, possibly based on the existing muting. If certain users satisfy certain criteria, then a modification of the muting (or a request for a new muting) is invoked in order to benefit those users.

According to this embodiment in which muting adaptation is used in conjunction with SFMN, once one or more users are selected to be beneficiaries of muting, the muting of certain cells (e.g., the K strongest neighbors of those users) can be modified taking into account the benefit and penalty to each cell and user, as described above. The hypotheses h1 and h2 for the calculation may be determined as follows: If the schedule (allocation of resources to users) was determined assuming no muting, then the initial interference hypothesis would be h1=all cells On, while the target hypothesis h2 would correspond to certain K neighbor cells of the selected users to be Off; or, if the schedule was determined assuming some existing muting pattern, then the initial hypothesis would be h1=the current muting, and the target h2 would correspond to certain additional resources in certain additional neighbor cells of the selected users to be Off.

In this embodiment, the new determined muting may then last for some duration of time. The schedule of some of the users (typically the ones based on which the muting adaptation was triggered) may remain fixed for that duration of time as well. Based on whether the proposed muting adaptation was accepted, the modulation and coding schemes of the selected users may be adapted as well in accordance with the modified muting. Further, the resource allocation in the initiating cell (or target muted cells) may also be modified. Other cells may benefit from the modified muting and they may be able to adjust their resource allocation or modulation and coding scheme selection based on knowledge of the modified muting.

Another embodiment comprises instantiation of muting with coordinated scheduling. In this embodiment, in each TTI, each cell estimates its PRB usage for scheduling in that TTI. Typically, this may be done before performing a full channel aware scheduling, so that this determination can be done early in the TTI. If a cell estimates that it is going to use less than 100% of the PRBs, it announces to other cells that it will mute a certain number of PRBs. The location of the muted PRBs for a cell can be chosen according to a preferred pattern for each cell, which can allow for appropriate aligning or staggering of muting across cells. Based on this announcement of which PRBs are going to be muted by neighbor cells, each cell (in particular the cells which are going to need 100% of the PRBs) can then do the scheduling with the knowledge of the muted PRBs. Thus, this can be considered as a variation of MFSN where the muting is determined first before scheduling, but the amount of muting is itself computed based on a pre-estimate of how many resources are likely to be needed. A further variant of the above scheme is that, instead of determining the amount of usage/muting and announcing to neighbors in each TTI, this is done at some slower time scale such as every N TTI.

According to certain embodiments, the trigger to modify the muting may also use other factors such as the speed of the UEs, the distribution of the speed of the UEs, or the number of UEs corresponding to high or medium or low speed, etc. For high-speed or even medium speed UEs, it is often difficult to properly exploit frequency domain fading with channel aware scheduling, because the channel fades can change too rapidly. For such UEs, it may be advantageous to use resources on which interference is muted, since the UE's channel feedback and control loops such as outer loop link adaptation can better reflect the achievable spectral efficiency within muted resources. Thus, this embodiment can take into account the number of UEs at various speeds in calculating the criterion for modifying the muting. For example, if the number of high-speed UEs (or the ratio of high-speed UEs to low-speed UEs) in a cell goes up, then the cell would want to preferentially schedule those UEs within muted resources. Therefore, the cell would have greater need for resources on which interferers are muted. Correspondingly, if the number of high speed UEs goes down, the cell would have less need for interference-muted resources to schedule such UEs. Accordingly, the cell's penalty for an interferer reducing the muting would go down.

Embodiments contemplate several conditions under which a muting adaptation request may be triggered. For example, muting adaptation can be triggered periodically with a configurable period. Additionally or alternatively, muting adaptation can be triggered on the occurrence of a certain event, for example, when congestion is detected in one or more cells. For instance, some events that may trigger muting adaptation comprise: PRB usage being greater than a threshold, a certain number of UEs not meeting a nominal bit rate, ratio of (sum of weights of eligible UEs or bearers) to number of available PRBs goes above a threshold, a "composite available capacity" of a cell goes below a threshold, and/or total backlogged buffered data in some QOS class (or across all UEs) is above a threshold.

According to another embodiment, muting adaptation can be triggered when the onset of some condition is detected, and then check again periodically until the condition that originally triggered no longer exists. Muting adaptation can be triggered autonomously by a cell, or by an explicit request from another cell. Autonomously triggering may refer to when a cell periodically receives metric reports from other cells, but then the cell itself determines based on the metrics when some change in muting is required.

Some embodiments also consider the amount of change in muting. According to one embodiment, the amount of muting can be changed by a fixed (configurable) amount (e.g., 1 PRB or 1 RBG). Alternatively, the amount of muting can be changed until the net benefit in utility (e.g., evaluated based on the hypothesis corresponding to the changed amount of muting) is no longer large enough. In other embodiments, a "target amount of muting" can be determined and the muting adapted in incremental steps towards the target amount of muting.

One way to determine a "target amount of muting" is the fraction of users who have a sufficiently large gain from muting, as a fraction of the total number of UEs. According to this example, $C'(u)$ represents the spectral efficiency of UE u when a given cell is muted, and $C(u)$ represents the spectral efficiency when that given cell is not muted. Then, it can be determined N=# of UEs such that $C'(u)/C(u)>T$, where T is a suitable threshold. The threshold T may be static, or may be related to the benefit/penalty metrics. Then, if the current amount of muting in that cell is less than N/Nall (i.e., expressing N as a fraction of total number of users), the muting can be increased; or, if the current amount of muting in that cell is more than N/Nall, the muting can be decreased.

Certain embodiments also consider the duration for which the modified muting amount should persist. One option is that the modified muting may persist until the next periodic adaptation occasion. Alternatively, if muting adaptation is triggered on the occurrence of some condition such as congestion in the cell, then the modified muting can persist until either that condition no longer exists or some even more severe condition is detected. The duration may be based, for example, on the amount of buffered data for some specific UEs (or overall backlog in the cell). Further, the duration may be based on the round-trip time or latency required to execute the muting adaptation decision procedure—if the latency of the procedure is several TTI, then the adapted muting may be set up to last for a duration of time sufficiently larger than the latency of the procedure.

Certain embodiments can apply to muting of multiple neighbors as well. For example, some users may be at the edge of their serving cell with two other interfering cells. Such users may be able to achieve significant gain from muting only if both interferers are muted. In this case, the interference hypothesis with muting would correspond to multiple interferers being simultaneously off. The calculation of net benefit and penalty would apply as described above, considering the appropriate cells muted.

An embodiment considers the case of only the strongest interferer muting (i.e., leaving out the case of taking advantage of 2 or more interferers simultaneously muted). In this embodiment, for a cell A, the benefit due to a given interferer B muting an additional resource can be written as UA(h2)−UA(h1). Therefore, UA(h2)−UA(h1)=PF'(A;B)−PF(A), where PF'(A) is achievable weighted PF metric when interferer B mutes and PF(A;B) is achievable weighted PF metric when interferer B is not muted. As an alternative, instead of PF'(A;B) (or PF(A;B)), the spectral efficiency can be used when achievable in A when B is muted (or not muted). Conversely, from the perspective of cell B, if it uses an additional resource it will get a benefit PF(B), while if it mutes the additional resource then its benefit is 0. In this example, each cell A reports to its neighbor B the quantity PF'(A;B)−PF(A;B). At each cell B, the decision rule for adaptation of muting is: If $\Sigma A[PF'(A;B)-PF(A;B)]>PF(B)*(1+\epsilon)$, then cell B should increase its muting by amount $\Delta$; and if $\Sigma \Delta [PF'(A;B)-PF(A;B)]<PF(B)*(1-\epsilon)$, then cell B should decrease its muting by amount $\Delta$. Otherwise, there is no change in muting.

Certain embodiments provide options for how a cell A may estimate PF'(A;B) relative to a specific interferer B being muted. A first option is, if cell B is already muting a non-zero amount, then cell A can maintain a separate PF filter over just the PRBs that cell B is muting, and estimate the PF (filter of max or average) of the UEs scheduled within those PRBs.

A second option, which works even when cell B is not muting anything, is to estimate PF'(A;B)=PF(A;B)*maxu(C'(u)/C(u)), where C'(u) is spectral efficiency achieved by user u when cell B is muted, and C(u) is spectral efficiency achieved by user u when cell B is muted. An alternative to max is PF'(A;B)=PF(A;B)*[avgu:C'(u)/C(u)>T C'(u)/C(u)]. If the set {u:C'(u)/C(u)>T} is empty, then PF'(A;B)=PF(A;B), i.e., no gain in PF. If cell B is already muting some resources, then C'(u)/C(u)=1, i.e., just use PF'(A;B)=PF(A).

A third option, which also works when cell B is not muting anything, is to estimate PF(A;B)=$\Sigma$u w(u), sum of weights of bearers with non-zero data, and then estimate PF'(A;B) with the same calculation as the second option above.

Another embodiment may provide a variation on how metrics are calculated and used. In this embodiment, each cell exchanges the cell-PF (or some load metric) with its neighbors. Assuming cell-PF_A and cell-PF_B are the cell-PF metrics of two cells A and B. Then, in this example, only the cell with the larger cell-PF is eligible to request the cell with the smaller cell-PF to mute. In addition, a threshold can be added to avoid ping-pongs: arg-max{cell-PF_A, cell-PF_B}>arg-min{cell-PF_A, cell-PF_B}+threshold, then cell arg-max{cell-PF_A,cell-PF_B} is eligible to mute the other cell. In each cell, this embodiment may also look at the fraction of UEs with C'/C>T, where T may be a threshold, where C' may be the Transport Block Size (TBS) or equivalently spectral efficiency of a UE in cell A when the cell B is muted, while C is the corresponding TBS or spectral efficiency when cell B is not muted. In the case where a cell has the least PF:

A given cell, if it figures out has the least PF among all its neighbors, can do additional muting. Assume this is cell B.

Among all its neighbors, cell B will look at the cell that has the second smallest proportion of UEs with C'/C>T, where C' is the TBS of the UE conditioned on cell B being muted.

If cell B's current muting proportion is smaller than the number in the bullet above, then cell B increases/decreases its muting, potentially all the way up to that number. Or incremental steps can be taken in that direction.

In the case where a cell has lesser PF than at least two of its neighbors:

The cell that has the lesser PF than at least two of its neighbors takes the cell with the second smallest value of the product of UEs with C'/C>1.5 and number of unmuted PRBs in that cell, among those with cell-PF larger that itself. Then the cell that is getting muted, mutes that number of PRBs, or increases or decreases the amount of muting towards that point in incremental steps.

Further embodiments of the invention can address how to exploit frequency-selective scheduling (FSS) gain. This is particularly useful when the radio channel of the user devices experiences frequency selective fading, due to which the spectral efficiency achievable by a user on different sub-bands is different. For instance, certain embodiments may determine which sub-bands or PRBs should be muted to maximize frequency-selective gain, and take into account frequency-selective fading in combination with muting gain.

According to this embodiment the potential benefit may be calculated at each cell i. For example, for each neighbor j and for each RBG r, cell i calculates its potential benefit B(i,j,r) if cell j was to mute in RBG r. As noted earlier, this benefit may be expressed relative to a reference muting hypothesis. As a result, embodiments can provide frequency-selective muting benefit, taking into account the channel conditions of users on RBG r, as well as the relative interference of users from cell j.

In this embodiment, the set of cells j for which the benefit is calculated is some suitable set of cells S(i). The benefit calculation may be based on how the scheduler performs frequency-selective scheduling (FSS)—thus the muting benefit calculation is in cohesion with how the FSS scheduler would allocate RBGs to the UEs, and allows capitalizing on both muting as well as frequency selective gains. Then, cell i may send the calculated benefit B(i,j,r) to cell j∈S(i): a "FSS-aware Benefit Metric List" (BML-FSS).

In addition, a penalty and net benefit determination can be made at each cell j. For example, cell j receives the benefit metric list B(i,j,r) per RBG r. The set of cells that send benefit information to a given cell j may be some suitable set of cells R(j), which may or may not be the same as the set of cells S(j) of cell j. Cell j may determine its own penalty for muting the RBG r, P(j,r). Cell j may also determine the net benefit to the system if cell j mutes on RBG r. For example, N(j,r)=$\Sigma$i∈R(j)B(i,j,r)−P(j,r). According to an embodiment, if the net benefit is negative, cell j does not mute on RBG r. However, if the net benefit is positive, then cell j may mute on RBG r.

According to this embodiment, the determination of muting may be performed according to the following. If cell j mutes on RBG r, then none of the other cells in R(j) should mute on RBG r (otherwise the muting benefit will be lost). Similarly, if j∈S(i) mutes, then cell i should not mute. Also, the cell that does mute on a given RBG, say i*, should have the maximum net benefit N(i*,r) among all the cells in S(i)

(or among R(i). Various methods are proposed to accomplish this, which may involve different forms of message exchange among the cells.

According to an embodiment, for any cell i, S(i) may be a suitable set of cells whose muting can benefit cell i. Typically these will be neighboring cells of cell i, or cells whose transmissions strongly interfere with cell i. Similarly, for any cell j, R(j) may be a suitable set of cells who will benefit from cell j's muting. In this embodiment, cell j should consider the benefit of cells in R(j) in determining its net benefit.

In one embodiment, if j∈S(i) then i∈R(j), a symmetry relationship, but this need not hold in other embodiments. Generally, for a given cell i, S(i) and R(i) could be different in various embodiments. In cells where frequency selective fading is important, the set S(i) and R(i) may in general be different for each frequency sub-band or RBG, but typically they may be the same for all RBGs.

The primary muting constraints according to this embodiment may comprise: if cell j mutes, then ideally any cell i∈R(j) should not also be muted in the same resources. Otherwise, the benefit of cell j's muting to cell iI may be lost. Similarly, in this example, if cell j∈S(i) is muting, then cell i should not mute. However, since j∈S(i) implies i∈R(j), the above two are equivalent.

In this example, locally optimal muting may mean that, if cell i mutes, ideally cell i should have the maximum net benefit in its "local neighborhood". Due to the primary muting constraints, if i is chosen to mute, then: no other cell in S(i) should mute (equivalently—no cell j such that i∈R(j) should mute); otherwise it may be better to mute some other cell rather than i. In other words, i should mute if i has the maximum net benefit of all cells in S(i).

In one embodiment, S(i) (and R(i)) can be taken as the "first ring" of interferers—the cells who are the strongest interferer for some UE in cell i. In another embodiment, S(i) and R(i) may be taken as the cells which are either the strongest or second strongest interferers for some UE in cell i. Additionally, certain embodiments may also incorporate a secondary muting constraint: from a cell i's perspective, multiple cells in S(i) should not mute on the same resource. Otherwise, cell i will not be able to benefit from all the muting, rather cell i would only benefit from one of those cells muting. In one embodiment, S(i) may consist of not only cells which are the strongest interferer of some UE in cell i, but also cells which are the strongest interferers of some UE in those cells.

Figure 13:
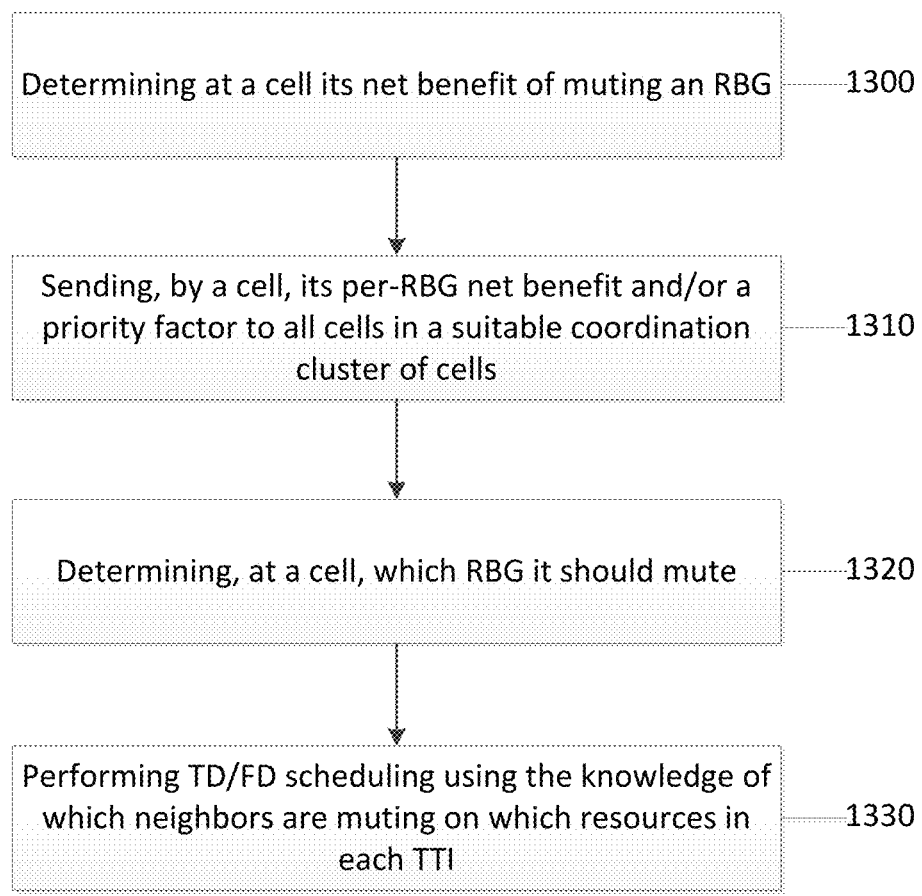
FIG. 13 illustrates an example flow diagram of a method, according to one embodiment.

FIG. 13 illustrates an example flow diagram of a method, according to one embodiment. This method may comprise, at 1300, determining at a cell its net benefit of muting an RBG. Then, at 1310, the method may comprise sending, by each cell, its per-RBG net benefit to cells in its neighborhood. This may be considered the FSS-aware Net Benefit Metrics List (NBML-FSS). At 1320, the method may further comprise determining, at a cell), which RBG it should mute, based on which cell has the maximum net benefit in neighborhood suitable coordination cluster of cells. In this example, a cell would not mute unless the net benefit is positive. In one embodiment, the method may comprise, at 1330, at a cell in a TTI, performing TD/FD scheduling using the knowledge of which neighbors are muting on which resources in each TTI. Alternatively, the determining step 1300 may be performed for a subset of each cell or a single cell and may be done for a subset of each RGB or for a single RGB, and the sending in step 1310 may done to a subset of each cells or a single cell (same applies to steps 1320 and 1330). Step 1330 may alternatively be done in a subset of each TTI or a single TTI.

Figure 14:
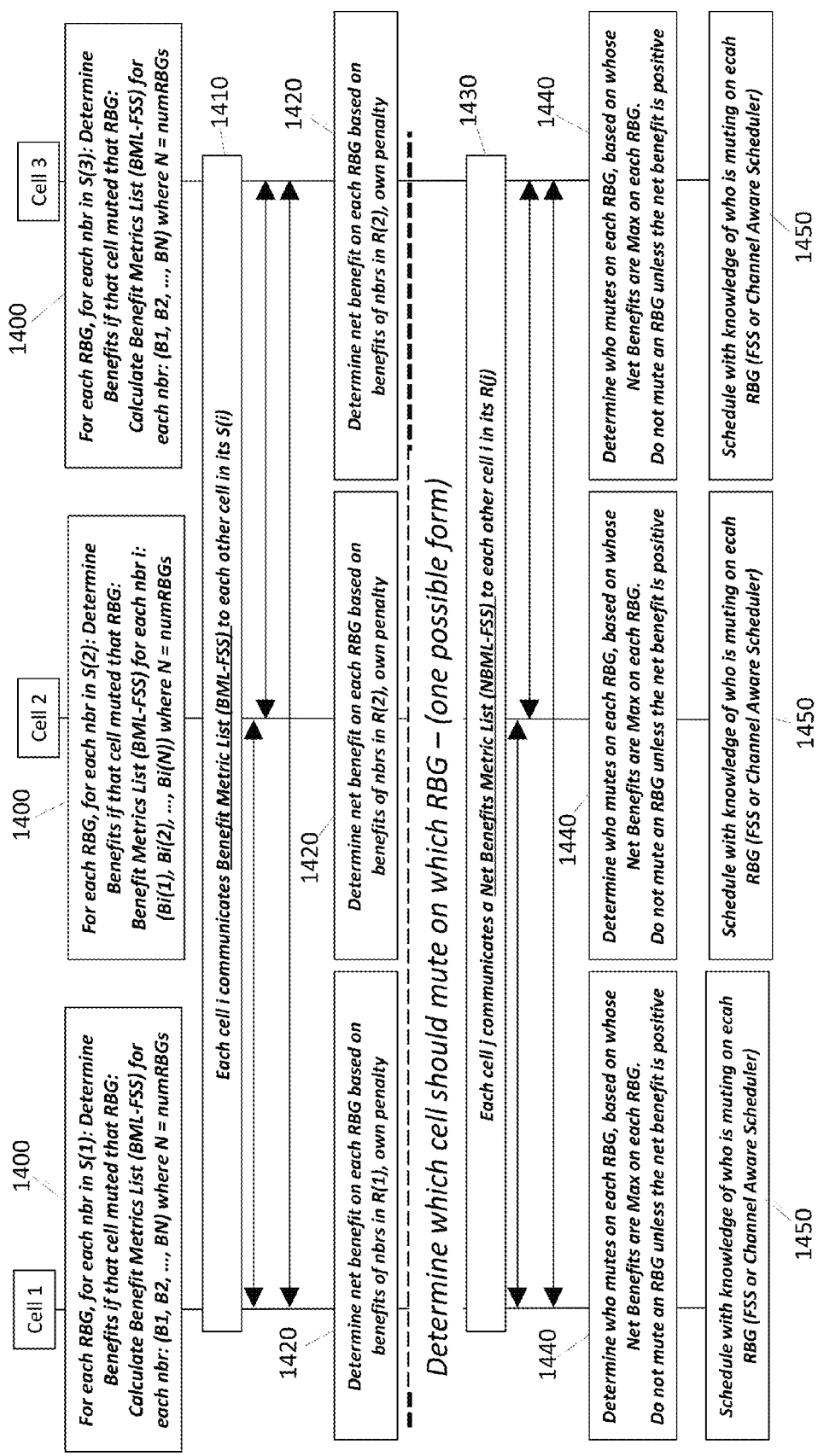
FIG. 14 illustrates an example of a signaling diagram, according to another embodiment.

FIG. 14 illustrates an example of a signaling diagram, according to an embodiment. For the purposes of description, we generically refer to the cells in the coordination set S(i) and R(i) of a given cell i as neighbor cells of cell i. It should be understood that this does not necessarily mean that the cells are physically adjoining, or that there are neighbor relationships between the cells for executing handoffs or other procedures. In this embodiment, at 1400, cell 1, cell 2, and cell 3 determine, for each RBG for each neighbor cell (abbreviated as 'nbr') in S(1), S(2), and S(3), respectively, benefits if that cell muted that RBG, and calculate a benefit metrics list (BML-FSS) for each nbr: (B1, B2, . . . , BN) where N=numRBGs. At 1410, each cell i communicates the benefit metrics list (BML-FSS) to each other cell in its S(i). Then, at 1420, each cell determines the net benefit on each RBG based on benefits of nbrs in R(i) and its own penalty. At 1430, each cell may communicate a net benefits metric list (NBML-FSS) to each other cell in its coordination cluster. At 1440, each cell determines who mutes on each RBG, based on whose net benefits are maximum on each RBG. In this example, a cell should not be muted unless the net benefit is positive. At 1450, each call may schedule with the knowledge of which cell is muted on each RBG. Accordingly, in this embodiment, a given cell is able to determine which cell will mute on which RBG, rather than simply determining whether the given cell will mute on a given RBG.

Another embodiment may comprise a non-GBR calculation of benefits. In this embodiment, at each cell i, when cell i calculates its benefit $B_{i,j}(r)$ due to cell j potentially muting on RBG r, the FSS-aware benefit may be calculated as $B_{i,j}(r)=\Delta PF_{i,j}(r)=PF_{i,j}(r)-PF_i(r)$, where $PF_{i,j}(r)=$max PF achievable by cell i on RBG r if cell j muted on RBG r (assuming no other cell in the coordination cluster muted on RBG r) and $PF_i(r)=$max PF achievable by cell i on RBG r if no cell in the coordination cluster muted on RBG r. A key characteristic is that this "max PF" used in the benefit calculation may be based on the same decision rule used by the scheduler for frequency-selective scheduling (FSS). Thus, the muting benefit calculation is in cohesion with how the FSS scheduler would allocate RBGs to the UEs. This maximizes the ability to get muting gains as well as frequency-selective scheduling gains. Cell i, for cell j's muting, has a list of benefits per RBG: $(B_{i,j}(1), B_{i,j}(2), \ldots, B_{i,j}(N))$, which is the benefit metric list for FSS (BML-FSS). Cell i sends this BML-FSS to each cell j in its S(i).

Further, according to this embodiment, at each cell j, the BML-FSS is received from each cell i in its R(j), and each cell j calculates the total benefit to its neighbors, i.e., $\Sigma_{i\neq j} B_{i,j}(r)$. For each RBG r, cell j calculates its own penalty: $P_j(r)=$max PF achievable by cell j on RBG r (assuming no muting). Cell j may then calculate its net benefit metric $\Delta B_j(r)=\Sigma_{I\neq j} B_{i,j}(r)-P_j(r)$—one value per RBG, which is a net benefit metric list (NBML-FSS).

Then, it is determined which cell mutes which RBG. Each cell j communicates its net benefit metric (on all RBGs) to all neighbors in its R(j). At each cell i, the net benefit is received (on all RBGs) from all cells j in its S(i). Cell i determines who is the max on each RBG: $M^*(r)=\arg\max_j \Delta B_j(r)$. If the maximum benefit on RBG r is positive, then cell $M^*(r)$ will mute on that RBG; otherwise, no muting on that RBG. Cell i then proceeds to do channel aware scheduling (FSS) with knowledge of who is muting on each RBG. If cell i itself is the muter, then cell i does not schedule anyone on that RBG.

In an alternative embodiment, the calculation of the net benefit of each cell j on RBG r N(j,r) is similar to the embodiment discussed above with some differences in how to determine which cell mutes on which RBG. In this alternative embodiment, it is not directly determined which cell has the "max net benefit" on each RBG in each TTI. Rather, in this embodiment, each cell calculates its own net benefit on each RBG at some time, and if its net benefit on some RBG is greater than the net benefit of whatever cell is currently muting that RBG, the cell claims the muting (and the other cell stops muting).

For example, at each cell i, the benefit $Bi,j(r)$ of cell i is calculated relative to any neighbour j at any asynchronous epoch (not necessarily deadline-bound). When cell i calculates its benefit $Bi,j(r)$ due to cell j potentially muting on RBG r: $Bi,j(r)=\Delta PFi,j(r)=PFi,j(r)-PFi(r)$, where $PFi,j(r)$=max PF achievable by cell i on RBG r if cell j muted on RBG r (assuming no other neighbour muted on RBG r) and $PFi(r)$=max PF achievable by cell i on RBG r if no neighbour muted on RBG r. Cell i, for cell j's muting, has list of benefits per RBG: $(Bi,j(1), Bi,j(2), \ldots, Bi,j(N))$ which is the Benefit Metric List for FSS (BML-FSS). Cell i may then send the BML-FSS list to cell j (not deadline bound).

At each cell j, the BML-FSS is received from each neighbor i in cell j's R(j) at various times (since those are asynchronous). At some asynchronous time, cell j may calculate the total benefit to cells in its R(j) (i.e., $\Sigma_{i \neq j} Bi,j(r)$) based on the latest BML-FSS received from each of the cells. For each RBG r, cell j may calculate its own penalty: $Pj(r)$=max PF achievable by cell j on RBG r (assuming no muting). Cell j may then calculate its net benefit metric $\Delta Bj(r)=\Sigma_{i \neq j} Bi,j(r)-Pj(r)$—one value per RBG, which is the Net Benefit Metric List (NBML-FSS).

For each RBG r that cell j is not already muting, cell j may compare its net benefit with the (previously announced) net benefit of whatever cell in its S(j) is currently muting RBG r. If Cell j's net benefit for RBG r>the last announced net benefit of the cell muting RBG r, then cell j may mark RBG r as "muting rights to be claimed". Cell j may then sends a message to all cells in its S(j) indicating for each RBG r: whether cell j is claiming the muting rights for that RBG (1-bit), and for which cell j will mute (either newly claimed muting, or already existing muting), cell j's new Net Benefit on that RBG At each cell i, in each TTI, cell i may then proceed to perform channel aware scheduling (FSS) with knowledge of who is muting on each RBG. If cell i itself is the muter, then cell i does not schedule anyone on that RBG. It should be understood that the communication and determinations undertaken by any given cell (e.g. Cell 1) need not occur strictly at the same time as the corresponding communication and determination by other cells (such as Cell 2 and Cell 3). For example, Cell 1 may undertake these actions using the latest information that it has received from Cell 2 and Cell 3, without any restriction on when Cell 2 and Cell 3 communicate their information to Cell 1.

Figure 15:
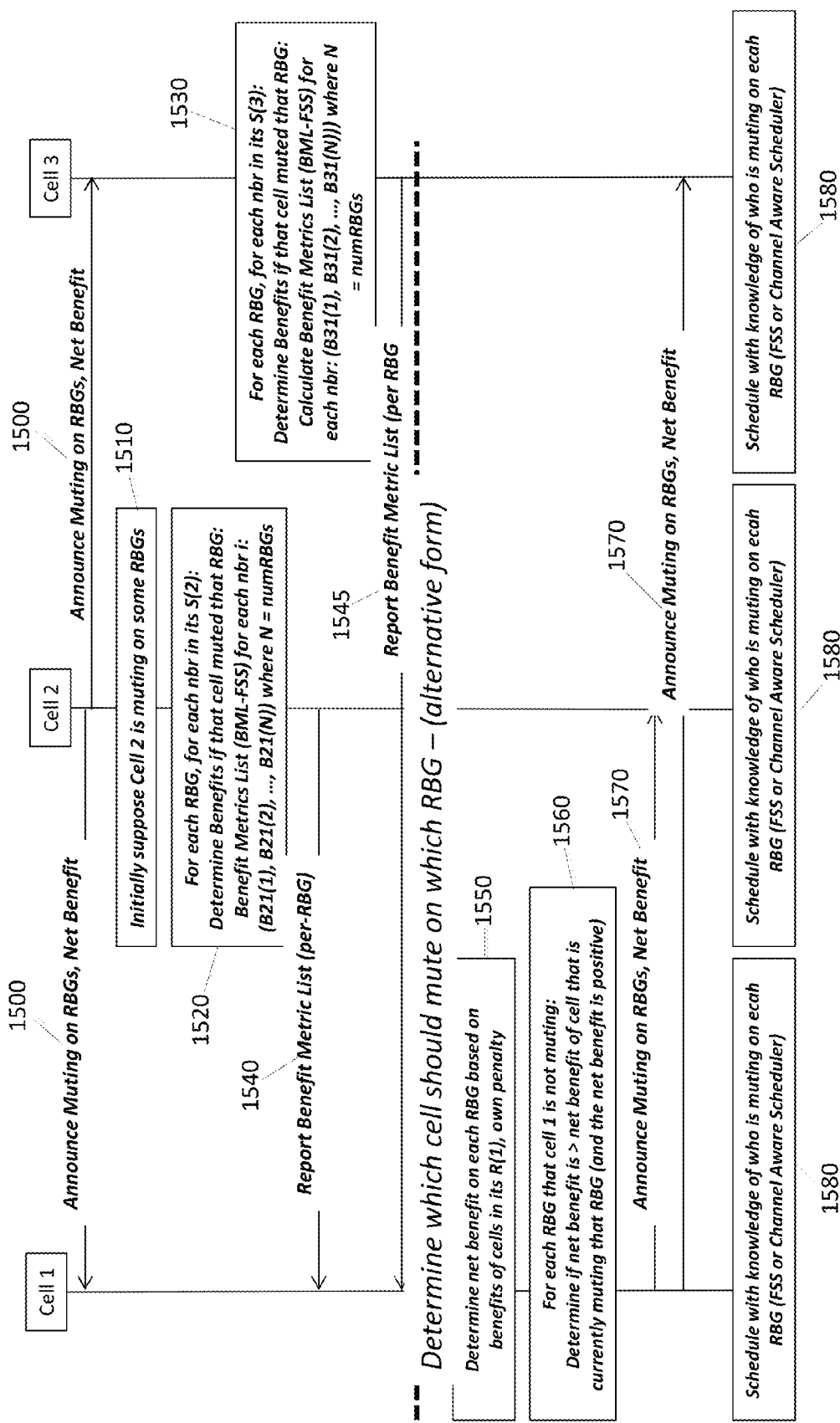
FIG. 15 illustrates an example of signaling diagram, according to another embodiment.

FIG. 15 illustrates an example of signaling diagram, according to an embodiment. In this example, at 1500, cell 2 announces muting on RBGs and the net benefit to cells 1 and 3. At 1510, it is initially assumed that cell 2 is muting on some RBGs. At 1520, for each RBG and for each nbr in its S(2), cell 2 determines the benefits if that cell muted that RBG and forms the Benefit Metrics List (BML-FSS) for each nbr i: $(B21(1), B21(2), \ldots, B21(N))$ where N=numRBGs. Then, at 1540, cell 2 may report its BML-FSS to cell 1. Similarly, at 1530, for each RBG and for each nbr in its S(3), cell 3 determines the benefits if that cell muted that RBG and forms its Benefit Metrics List (BML-FSS) for each nbr i: $(B31(1), B31(2), \ldots, B31(N))$ where N=numRBGs. At 1545, cell 3 may report its BML-FSS to cell 1.

Continuing with the example of FIG. 15, at 1550, cell 1 may determine the net benefit on each RBG based on benefits of cells in its R(1), and its own penalty. Then, at 1560, for each RBG that cell 1 is not muting, it may determine if the net benefit is greater than the net benefit of the cell that is currently muting that RBG (and the net benefit is positive). At 1570, cell 1 may announce muting on RBGs and the net benefit to cells 2 and 3. Each of cells 1, 2, and 3 may then, at 1580, schedule with knowledge of who is muting on each RBG.

According to yet another embodiment, the calculation of the net benefit of each cell j on RBG r N(j,r) is similar to the embodiment discussed above, with some differences in how to determine which cell mutes on which RBG. In this embodiment, each cell j has a threshold D(j) (or D(j,r)). If the net benefit on an RBG N(j,r) is greater than threshold D(j,r), then the cell can mute on RBG r. The threshold D(j,r) can be either operator configured, or dynamically discovered. One form of dynamic discovery comprises the following. Each cell has a current D(j,r) and, if a cell finds that its net benefit is greater than D(j,r), it may mute RBG r and send a message to other cells announcing its net benefit. Other cells may then treat that cell's net benefit as the D(j,r) that they should exceed if they want to mute. Thus, the threshold can be dynamically pegged to whichever cell is currently muting. Accordingly, this embodiment allows a cell to mute even if it does not necessarily have the maximum net benefit among cells in its local neighborhood (as long as the net benefit is greater than a threshold).

At least some of the embodiments discussed above imply that a "full exchange" of information has to be conducted. However, certain embodiments are not so limited and methods described herein can work with partial information as well. For example, when the benefit metric list (BML-FSS) is sent to a given neighbor, not all RBGs r need to be included—only the ones for which the benefit calculation has been updated need to be sent. When a cell j determines its net benefit, it need not have the full BML-FSS from all the cells in its R(j) set. For instance, if it has received information only from some subset of cells, it can use the updated information from those cells and the last known information from other cells. Once information is sufficiently old, it can be discarded as stale. Similarly, the determination of net benefit and muting decision need not be done on all RBGs at once, it may be done on a few RBGs at a time, so as to spread out the computation load.

In view of the above, embodiments can maximize the potential benefit of muting by choosing the muting decision in sync with how the scheduler maximizes frequency-selective scheduling gains. In other words, according to certain embodiments, the muting benefit calculation is in cohesion with how the FSS scheduler would allocate RBGs to the UEs, and allows capitalizing on both muting as well as frequency selective gains.

In some of the embodiments discussed above, it may have been assumed that the set of cells over which the joint optimization is performed (variously known as a cluster, coordination cluster, or cooperation area) is a pre-determined set {cell 1, cell 2, . . . cell N}. This is a common assumption in the art. The entire set of cells in the network may be viewed as partitioned into clusters such as the set {cell 1, cell 2, . . . cell N}. Any given cell is part of at most one cluster of cells, and no two clusters overlap. Such a cluster definition may be referred to as a non-overlapping cluster.

With such a cluster definition for any given cell k, the joint optimization of the choice of muting hypothesis is done considering the benefit (or penalty) for each cell when some other cell within the cluster is muted. That is, if a cell k has some strong interferers that are not part of the same cluster as cell k, then the possible benefit from muting those interferers is not taken into account when determining the optimal muting decision. Indeed, from the perspective of cell k, the Channel State Information reports (CSIs) of its UEs when a strong interferer that is outside the cluster is muted may not even be available for the purposes of determining the benefit or optimization of the muting decision. Here CSI typically may be a report sent by the UE to inform a cell what is the current radio channel quality experienced by the UE relative to that cell. CSI reported by a UE can include also information about the radio channel quality experienced by the UE relative to certain other cells. Thus, the main drawback of the conventional way of defining clusters as non-overlapping sets of cells is that for several cells, not all of their strong interferers may be taken into account when doing the joint optimization.

Figure 16:
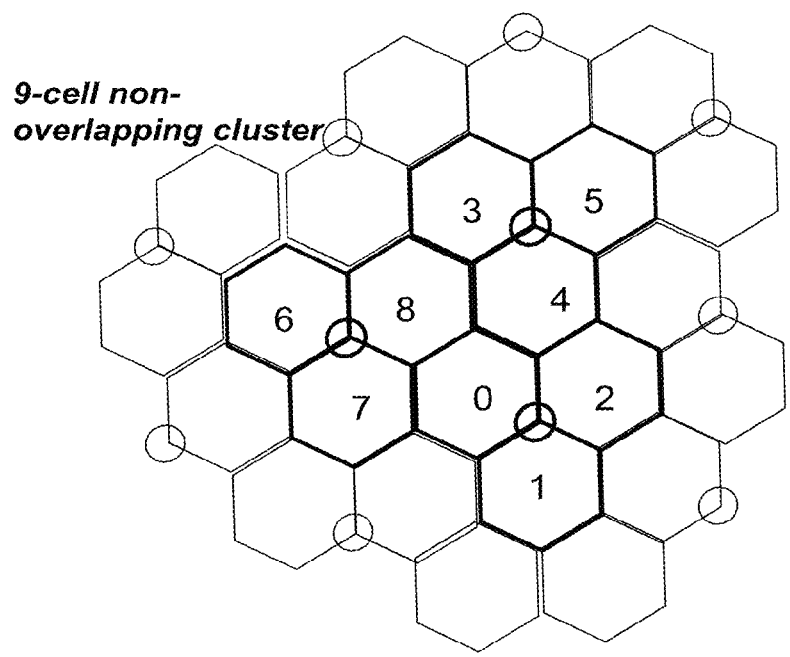
FIG. 16 illustrates an example of a non-overlapping cluster, according to an embodiment.

This is illustrated in FIG. 16, where the set of cells in the network is partitioned into non-overlapping clusters of 9 cells, made up of 3 adjacent 3-sector sites. One such cluster is illustrated in FIG. 16. As can be seen from the example in FIG. 16, the "border" cells of the cluster participate in a muting optimization only with a subset of their strong interferers that are part of the same cluster. But that excludes a significant number of strong interferers.

Rather than non-overlapping clusters of cells, a more flexible way of defining a cluster would be to consider the set of cooperating cells from a given cell's perspective, that is, to consider the set of cells with which a given cell should coordinate. Thus, we can associate a cluster of cells with each given cell.

Figure 17:
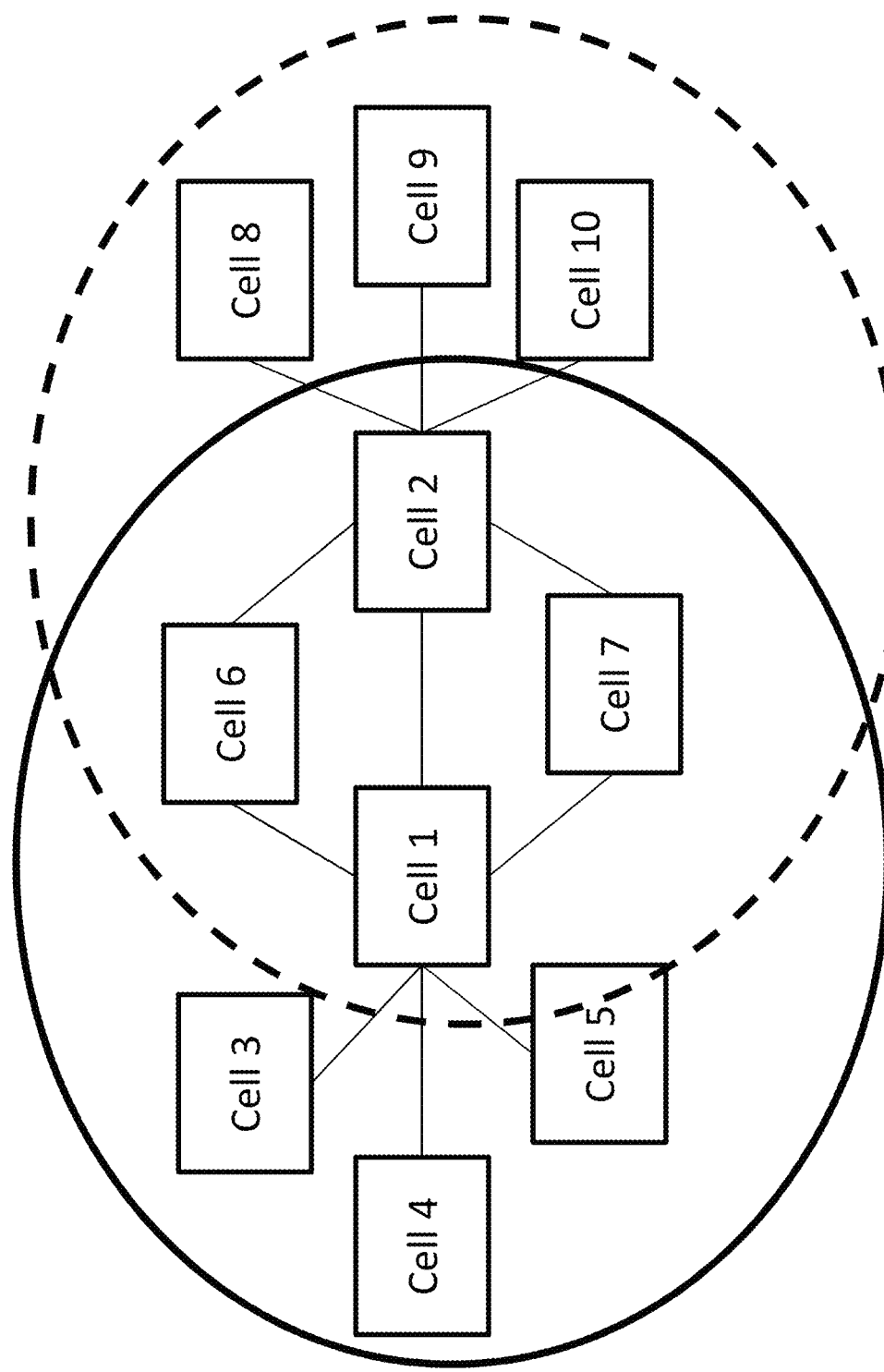
FIG. 17 illustrates an example of a Liquid Cluster, according to an embodiment.

FIG. 17 depicts an illustration of this concept. Various cells are shown in FIG. 17. Cells that are shown as connected by a solid line can coordinate with each other, whereas cells that are not shown as connected do not coordinate. The region marked by the solid circle contains the set of cells with which Cell 1 will coordinate (i.e. the Cluster associated with Cell 1), while the region marked by the dashed circle contains the set of cells with which Cell 2 will coordinate (i.e. the Cluster associated with Cell 2). When it is to be determined whether Cell 1 should undertake a certain action, there will be coordination among the cells in the Cluster associated with Cell 1. For the purposes of coordination, Cell 1 may exchange messages with the cells in the Cluster associated with Cell 1. Correspondingly, when it is to be determined whether Cell 2 should undertake a certain action, there will be coordination among the cells in the Cluster associated with Cell 2, and Cell 2 may exchange messages with the cells in the Cluster associated with Cell 2. In Figure DEF, Cell 2 is part of the Cluster associated with Cell 1, while Cell 1 is part of the Cluster associated with Cell 2. However, there are one or more cells in the Cluster associated with Cell 1 that are not part of the Cluster associated with Cell 2, for example Cell 3. Similarly, there are one or more cells in the Cluster associated with Cell 2 that are not part of the Cluster associated with Cell 1, for example Cell 8. As noted earlier, we use the term "cell" interchangeably with various terms such as base station, eNodeB (eNB), transmitter, or network element.

The action to be undertaken (by Cell 1 or Cell 2 above) may pertain to a given set of resources. The coordination messages exchanged between the cells may also pertain to the given set of resources. The Cluster associated with Cell 1 may then be for the purposes of coordination of the action related to the given set of resources, and so also the Cluster associated with Cell 2. Thus on any given set of resources on which an action may be undertaken by one or more cells, the clusters associated with the cells would have the characteristics illustrated above. In other words, if we consider the coordination of actions by one or more cells pertaining to a given set of resources, the clusters of cells that coordinate to undertake the actions pertaining to the given set of resources are not non-overlapping.

A cluster configuration with the characteristics illustrated in FIG. 17 may be referred to as a Liquid Cluster. One may identify the following characteristics for a Cell or other network element that is associated with a Liquid Cluster for the purposes of coordination for undertaking a certain action. Such a network element may be configured for receiving a coordination message from a first set of network elements pertaining to taking an action by the network element. The action by the network element may pertain to a first set of resources. The first set of network elements contains a second network element. The second network element may be configured for receiving a coordination message from a second set of network elements pertaining to taking an action by the second network element. The action by the second network element may also pertain to the first set of resources. The second set of network elements contains the network element. Furthermore, at least one of the following is true—either the first set of network elements contains at least one network element that is not contained in the second set of network elements, or the second set of network elements contains at least one network element that is not contained in the first set of network elements.

Due to these characteristics, the Liquid Cluster associated with any one cell or network element could in general be different from the Liquid Cluster associated with another cell or network element, and the Liquid Clusters of two cells may overlap. A cell may be part of the Liquid Clusters associated with multiple other cells. The action by the network element referred to above can variously comprise one of muting the transmission, changing the on-duration, reducing the transmit power, beamforming the transmission, restricting the transmission mode or rank of certain transmissions, or the like. The action may further comprise one of determining a suitable transmission point for a user device from among the cells in its Cluster, or carrier aggregation for one or more user devices, or load-balancing, or adaptation of an interference coordination pattern such as the Almost-Blank Subframe pattern used in Enhanced Inter-Cell Interference Coordination, or the like. The coordination message received by the network element may be any one of the messages in the various embodiments described herein, or some other message pertaining to coordination for one of the actions described above. Further, multiple Liquid Clusters may be associated with a given network element. For example, one may also contemplate coordination of actions wherein a given network element receives a first coordination message from cells in a first Liquid Cluster associated with the given network element, while the given network element may receive a second coordination message from cells in a second Liquid Cluster associated with the network element. It should also be noted that the network element associated with a Liquid Cluster as described above may also transmit a coordination message, rather than (or in addition to) receiving a coordination message. One may also contemplate a Liquid Cluster associated with a given cell for the purposes of transmitting coordination messages, which may be different from the Liquid Cluster associated with the given cell for the purposes of receiving coordination messages. Furthermore, at different steps in the coordination sequence, a cell may be interact with different Liquid Clusters associated with the cell. In addition, one may contemplate Liquid Clusters associated with groups of cells rather than with a single cell, with substantially similar characteristics as described above. Thus, for example, one may contemplate a Liquid Cluster associated with a pair of network elements. In such a cluster configuration, one or both of the network elements in the pair of network elements may be configured for receiving a coordination message from a first set of network elements pertaining to taking an action by one or both of the pair of network elements. The action by one or both of the pair of network elements may pertain to a first set of resources. The first set of network elements contains a second network element, which is one of a second pair of network elements. The second network element may be configured for receiving a coordination message from a second set of network elements pertaining to taking an action by one or both of the second pair of network elements. The action by one or both of the second pair of network elements may also pertain to the first set of resources. The second set of network elements contains one or both of the pair of network elements. Furthermore, at least one of the following is true—either the first set of network elements contains at least one network element that is not contained in the second set of network elements, or the second set of network elements contains at least one network element that is not contained in the first set of network elements.

For example, for a given cell, the Liquid Cluster associated with the given cell may comprise the set of all neighboring cells that are strong interferers of some UE in the given cell. Strong interferers may be identified as the strongest interferer, or one of the top N interferers for some suitable value of N, etc. The Liquid Cluster associated with a given cell may also include neighbor cells that overlap in coverage with the given cell at the same transmission frequency or different transmission frequency (including pico-cells or macro-cells, for example in the case of heterogeneous network deployments).

Figure 18:
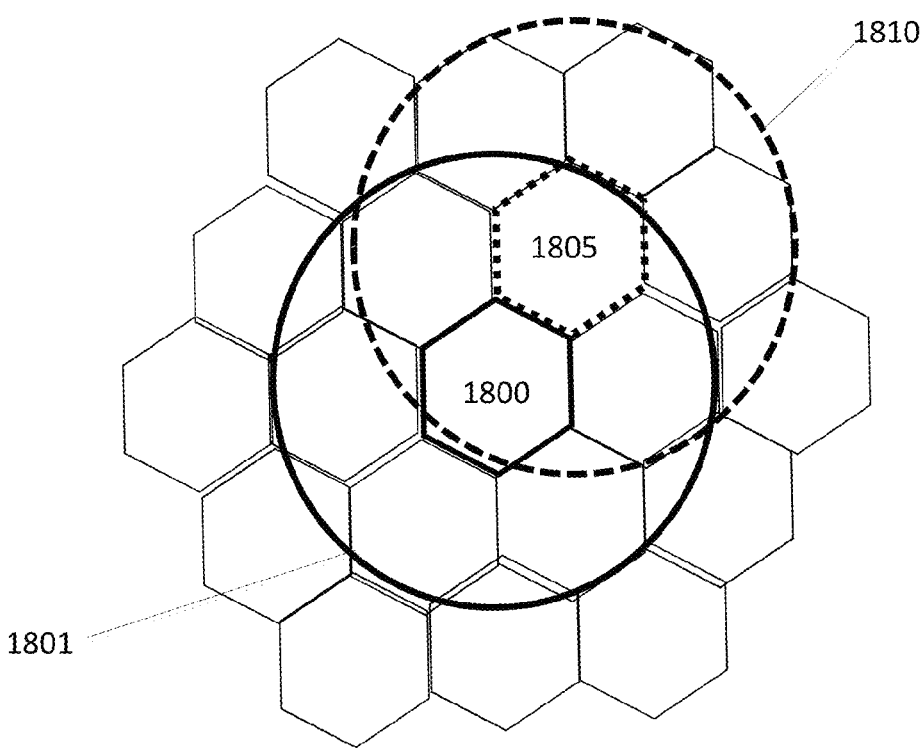
FIG. 18 illustrates an example Liquid Cluster, according to an embodiment.

FIG. 18 illustrates an example of the Liquid Cluster, according to one embodiment. With the cells in a regular hexagonal lattice, the strong interferers of any given cell will typically be the 6 cells that surround the given cell. In the example of FIG. 18, the Liquid Cluster for the cell 1800 can be defined as the set of cells within the circle 1801 (i.e., the cell 1800 and its 6 surrounding neighbors in the hexagonal cell grid), and this includes the cell 1805. This Liquid Cluster configuration may be referred here as a 7-cell Liquid Cluster. Correspondingly, the Liquid Cluster for the cell 1805 can be defined as the set of cells in the circle 1810 (i.e., the 6 neighbors surrounding the cell 1805), and this includes the cell 1800. Thus, each cell may have its own Liquid Cluster of cells with whom it coordinates for the purposes of joint optimization. One cell's Liquid cluster can overlap with the Liquid Cluster of another cell, and any given cell can be part of the Liquid Clusters of multiple other cells.

The use of Liquid Clusters brings significant benefits due to the ability to optimize the muting decision by incorporating the benefit to a cell due to muting any of its strong interferers, rather than just a subset of the interferers as in the non-overlapping cluster case.

Figure 19:
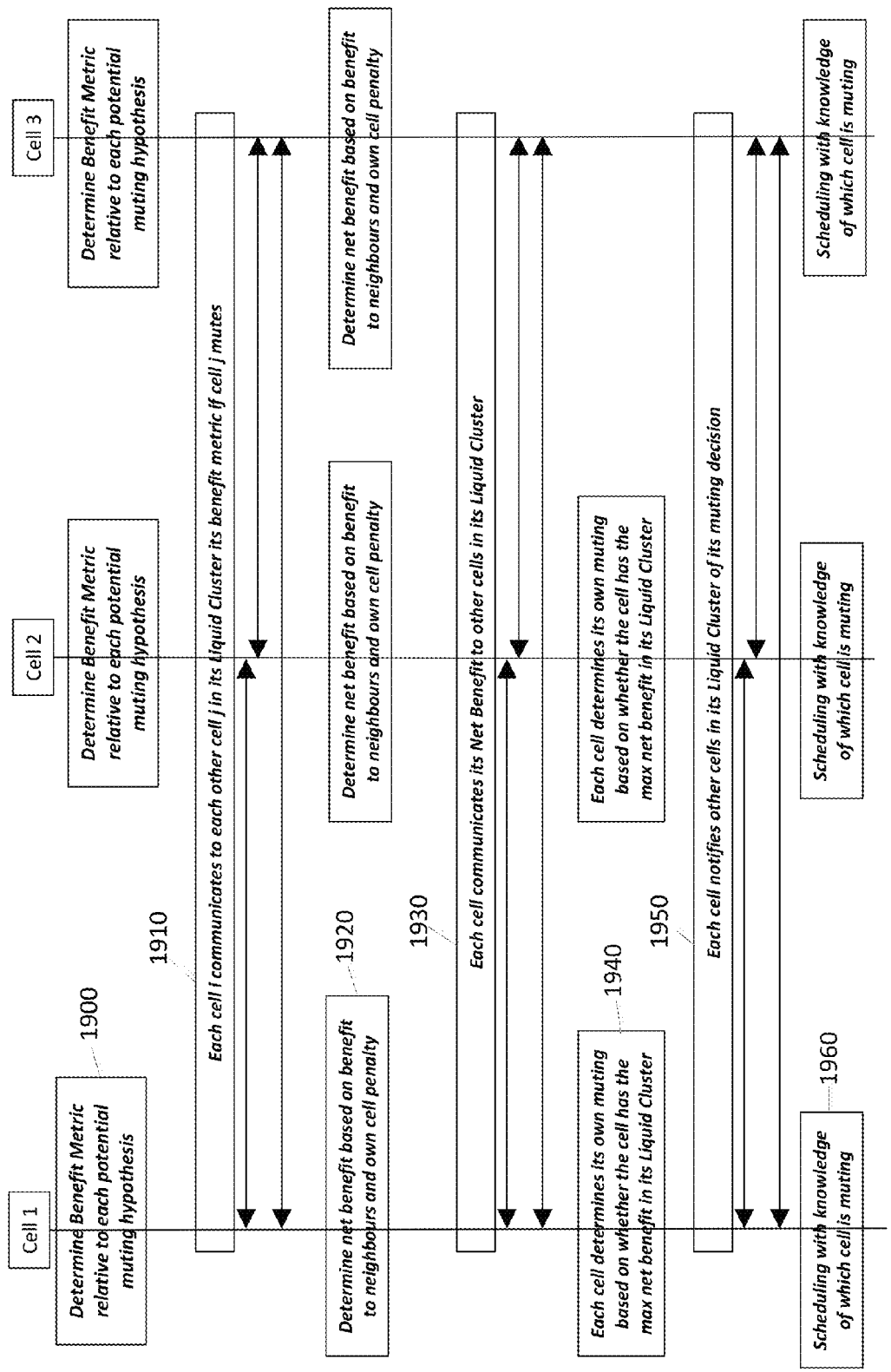
FIG. 19 illustrates an example application of decentralized Max-Net-Benefit solution to Liquid Clusters, according to an embodiment.

FIG. 19 depicts an illustration of an embodiment wherein cells associated with Liquid Clusters coordinate for the purposes of muting hypothesis determination. Cells 2 and 3 are in the Liquid Cluster associated with Cell 1, and each may have its own associated Liquid Cluster which contains cells that are not in the Liquid Cluster of Cell 1. At 1900, cell 1 determines a benefit metric relative to each potential muting hypothesis. Here, the relevant potential muting hypotheses considered by Cell 1 would correspond to muting by other cells in the Liquid Cluster associated with Cell 1. The determination of the benefit metric by Cell 1 may be according to any of the embodiments mentioned herein. At 1910, Cell 1 communicates to each cell in its Liquid Cluster its benefit metric if under the hypothesis where particular cell would mute. At 1920, Cell 1 determines its net benefit based on the benefit metrics received from other cells and the penalty incurred that would be incurred by Cell 1 due to muting. At 1930, Cell 1 communicates its net benefit to other cells in its Liquid Cluster. At 1940, Cell 1 determines whether to mute based on its own net benefit and net benefit of other cells in its Liquid Cluster, for example, by determining whether it has the maximum net benefit among the cells in its Liquid Cluster. Alternatively Cell 1 may determine whether to mute simply based on whether its own net benefit is high enough, or on whether its own net benefit is positive. At 1950, Cell 1 communicates its muting determination to other cells in its Liquid Cluster. At 1960, Cell 1 may then allocate resources among its users based on the knowledge of which other cell in its Liquid Cluster would be muting. It should be understood that along with the steps undertaken by Cell 1, similar steps may also be undertaken by other cells such as Cells 2 and 3. For example, similar to Cell 1's action at 1900, Cell 2 and Cell 3 may also determine their benefit metrics relative to each potential muting hypothesis, where the potential hypotheses considered by a given cell would correspond to muting by cells in the Liquid Cluster associated with that cell. Similar to Cell 1's actions at 1910, Cell 2 and Cell 3 may also communicate their benefit metrics to each other cell in their respective Liquid Clusters, wherein again the benefit metric sent to a given cell is computed for the hypothesis where that given cell would be muted, etc. It should be understood that these steps may be undertaken by Cell 1 and other cells in a frequency selective way. For example, by computing the benefit and penalty metrics in a frequency selective manner, i.e., separate benefit and penalty metrics may be determined for each frequency sub-band, typically using frequency selective channel state information received from UEs. Typically in this case the determination of muting by Cell 1 may be made separately for each frequency sub-band.

Figure 20:
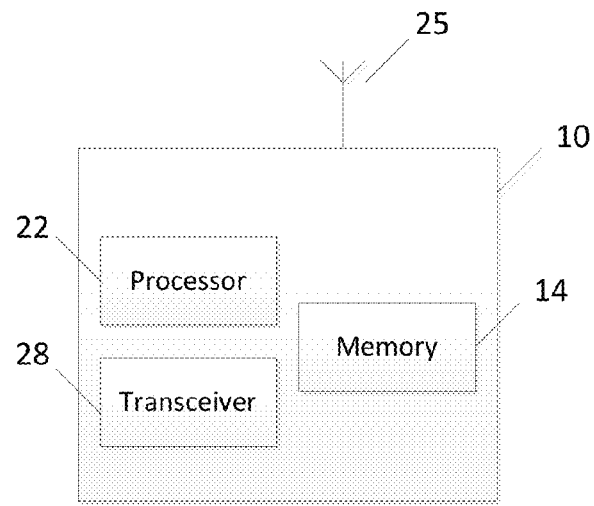
FIG. 20 illustrates an apparatus according to one embodiment.
Figure 21:
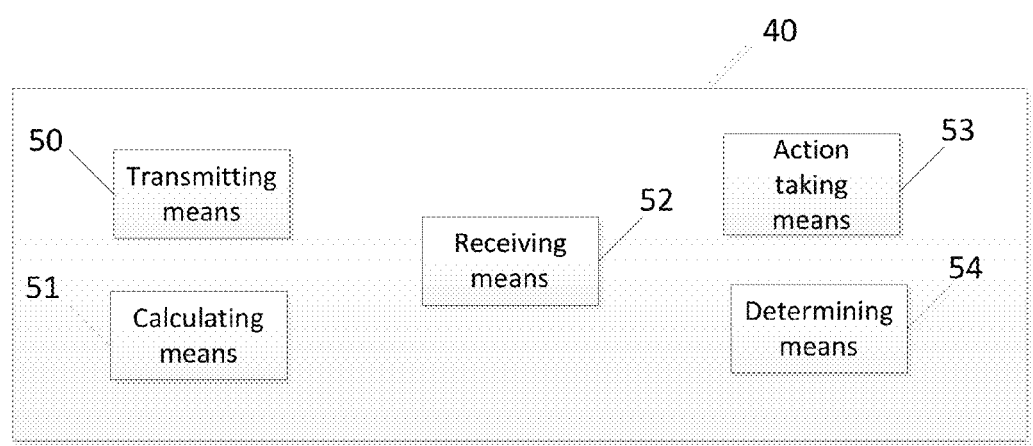
FIG. 21 illustrates an apparatus according to another embodiment.

FIG. 20 illustrates an example of an apparatus 10 according to an embodiment. In one embodiment, apparatus 10 may be a network element. For instance, apparatus 10 may be a non-centralized or centralized network element. Further, it should be noted that one of ordinary skill in the art would understand that apparatus 10 may comprise components or features not shown in FIG. 20. Only those components or features necessary for illustration of the invention are depicted in FIG. 20.

As illustrated in FIG. 20, apparatus 10 comprises a processor 22 for processing information and executing instructions or operations. Processor 22 may be any type of general or specific purpose processor. While a single processor 22 is shown in FIG. 20, multiple processors may be utilized according to other embodiments. In fact, processor 22 may comprise one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further comprises a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may comprise program instructions or computer program code that, when executed by processor 22, enable the apparatus 10 to perform tasks as described herein.

Apparatus 10 may also comprise one or more antennas 25 for transmitting and receiving signals and/or data to and from apparatus 10. Apparatus 10 may further comprise a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may comprise, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a non-centralized or centralized network element, such as a base station or access point. In one embodiment, apparatus 10 may be controlled by memory 14 and processor 22 to transmit a calculated impact information for a cell of the network element when taking an action related to a cell of the network element and/or when taking an action related to a cell of a second network element, and/or to transmit a request for taking the action related to the cell of the second network element. The action may comprise muting the transmission, changing the on-duration, changing the transmit power, beamforming the transmission, and/or changing the transmission mode or rank of the transmission. The impact may comprise benefit/penalty information. The benefit/penalty information may comprise an amount of resources for the action, an indication of specific frequency resources for the action, an indication of specific frequency sub-band resource for the action, an indication of specific time for the action, and/or an indication of the duration for the action. In some embodiments, the benefit/penalty information may be calculated based on a specific user device. According to certain embodiments, apparatus 10 may be controlled by memory 14 and processor 22 to calculate a net benefit based on the calculated impact information, and to transmit the net benefit to the second network element.

In another embodiment, apparatus 10 may be a network element controlled by memory 14 and processor 22 to receive impact information for a cell of a second network element when taking an action related to the cell of the second network element, and/or when taking an action related to a cell of the network element, to receive a request from the second network element for taking an action related to a cell of the network element, and/or to receive a command from a central network element for taking an action related to a cell of the network element. Apparatus 10 may be further controlled by memory 14 and processor 22 to take the action related to the cell of the network element based at least on one of the received impact information, the command, or the request.

According to this embodiment, apparatus 10 may be a network element controlled by memory 14 and processor 22 to calculate a penalty/benefit for taking the action, to calculate a net benefit based on the received impact information and the calculated penalty/benefit information, and/or to determine whether to undertake the action based on the calculated net benefit. Apparatus 10 may be controlled by memory 14 and processor 22 to determine whether to undertake the action by determining specific resources on which the action will be undertaken. In addition, in an embodiment, determining whether to undertake the action may further comprise receiving net benefit information from at least one other network element, and determining to undertake the action based a comparison of the calculated net benefit and the net benefit information received from the at least one other network element. Apparatus 10 may be further controlled by memory 14 and processor 22 to communicate a notification of the determination of undertaking the action to at least one other network element.

In another embodiment, apparatus 10 may be a centralized network element, such as a core network element. According to this embodiment, apparatus 10 may be controlled by memory 14 and processor 22 to receive from a first network element impact information for a cell of the first network element when taking an action related to a cell of the first network element, or when taking an action related to a cell of a second network element, and/or to receive a request for taking an action related to the cell of the second network element. Apparatus 10 may be further controlled by memory 14 and processor 22 to transmit a command for taking the action related to the cell of the second network element based on the received impact information and/or request. The impact information may comprise at least one of benefit information, penalty information, or net benefit information.

Another embodiment is directed to an apparatus 40 which may be a network element, which may comprise transmitting means 50 for transmitting a calculated impact information for a cell of the network element when taking an action related to a cell of the network element and/or when taking an action related to a cell of a second network element, and/or for transmitting a request for taking the action related to the cell of the second network element. The action may comprise muting the transmission, changing the on-duration, changing the transmit power, and/or beamforming the transmission. The impact may comprise benefit/penalty information. The benefit/penalty information may comprise an amount of resources for the action, an indication of specific frequency resources for the action, an indication of specific frequency sub-band resource for the action, an indication of specific time for the action, and/or an indication of the duration for the action. In some embodiments, the benefit/penalty information may be calculated based on a specific user device. According to certain embodiments, apparatus 40 may also comprise calculating means 51 for calculating a net benefit based on the calculated impact information, the transmitting means 50 may transmit the net benefit to the second network element.

In another embodiment, apparatus 40 may be a network element which may comprise a receiving means 52 for receiving impact information for a cell of a second network element when taking an action related to the cell of the second network element, and/or when taking an action related to a cell of the network element, for receiving a request from the second network element for taking an action related to a cell of the network element, and/or for receiving a command from a central network element for taking an action related to a cell of the network element. Apparatus 40 may further comprise action taking means 53 for taking the action related to the cell of the network element based at least on one of the received impact information, the command, or the request.

According to this embodiment, calculating means 51 may calculate a penalty/benefit for taking the action, calculate a net benefit based on the received impact information and the calculated penalty/benefit information, and/or determine whether to undertake the action based on the calculated net benefit. Apparatus 40 may also comprise determining means 54 for determining whether to undertake the action by determining specific resources on which the action will be undertaken. In addition, in an embodiment, the determining means 54 may determine whether to undertake the action may further comprise receiving net benefit information from at least one other network element, and determine to undertake the action based a comparison of the calculated net benefit and the net benefit information received from the at least one other network element. In an embodiment, transmitting means 50 may communicate a notification of the determination of undertaking the action to at least one other network element.

In another embodiment, apparatus 40 may be a centralized network element, such as for example a core network element. According to this embodiment, receiving means 52 may receive from a first network element impact information for a cell of the first network element when taking an action related to a cell of the first network element, or when taking an action related to a cell of a second network element, and/or receive a request for taking an action related to the cell of the second network element. Transmitting means 50 may then transmit a command for e.g., taking the action related to the cell of the second network element based on the received impact information and/or request. The impact information may comprise at least one of benefit information, penalty information, or net benefit information.

In various embodiments, the benefit/penalty information and/or net benefit information may contain indications of quality of service characteristics, and/or may contain indications of beamforming coefficients or beamforming weights or beamforming direction indicators or the like.

In some embodiments, the functionality of any of the methods described herein may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A network element, comprising:
at least one processor; and
at least one memory comprising computer program code, wherein the at least one memory and the computer program code are configured, with the at least one processor, to cause the network element at least to transmit at least one of:
calculated impact information for a cell of the network element when taking at least one of an action related to the cell of the network element or an action related to a cell of a second network element; and
a request for taking the action related to the cell of the second network element, wherein the action comprises at least one of muting a physical resource block, changing the cell's on-duration, reducing the cell's transmit power, or beamforming the transmission,
wherein the impact information for the cell of the network element is calculated by the network element, and quantifies the impact experienced by the cell, if the physical resource block is muted, and
wherein the impact information comprises at least one of benefit information or penalty information, and a priority factor.

2. The network element of claim 1, wherein the benefit information or the penalty information further comprises a list of elements, wherein each of the elements represents information about the benefit/penalty information relative to a set of resources.

3. The network element of claim 1, wherein the benefit/penalty information further comprises at least one of:
an amount of resources for the action;
an indication of specific frequency resources for the action;
an indication of specific frequency sub-band resource for the action;
an indication of beamforming coefficients;
an indication of specific time for the action; or
an indication of the duration for the action.

4. The network element of claim 1, wherein the at least one memory and the computer program code are further configured, with the at least one processor, to cause the network element at least to:
calculate a net benefit based on the calculated impact information; and
transmit the net benefit to the second network element.

5. The network element of claim 1, wherein priority factor is based on at least one of:
- a congestion of a physical-downlink-control-channel or an enhanced-physical-downlink-control-channel,
- a use of range extension,
- a channel type, and
- Quality-of-Service characteristics of a data channel transmission.

6. A network element, comprising:
- at least one processor; and
- at least one memory comprising computer program code, wherein the at least one memory and the computer program code are configured, with the at least one processor, to cause the network element at least to receive at least one of:
- impact information for a cell of a second network element when taking at least one of an action related to the cell of the second network element, or an action related to a cell of the network element, wherein
- the action comprises at least one of muting a physical resource block, changing the cell's on-duration, reducing the cell's transmit power, or beamforming the transmission,
- wherein the impact information for the cell of the network element is calculated by the network element, and quantifies the impact experienced by the cell, if the physical resource block is muted, and
- wherein the impact information comprises benefit information or penalty information, and a priority factor;
- a request from the second network element for taking an action related to the cell of the network element;
- a command from a central network element for taking an action related to the cell of the network element; and
- take the action related to the cell of the network element based at least on one of the received impact information, the command, or the request.

7. The network element of claim 6, wherein the at least one memory and the computer program code are further configured, with the at least one processor, to cause the network element at least to:
- calculate a penalty or a benefit for taking the action;
- calculate a net benefit based on the received impact information and the calculated penalty information or benefit information; and
- determine whether to undertake the action based on the calculated net benefit.

8. The network element of claim 7, wherein the calculated net benefit is transmitted to at least one other network element.

9. The network element of claim 7, wherein the determining whether to undertake the action further comprises:
- receiving net benefit information from at least one other network element; and
- determining to undertake the action based on a comparison of the calculated net benefit and the net benefit information received from the at least one other network element.

10. The network element of claim 6, wherein the priority factor is based on at least one of:
- a congestion of a physical-downlink-control-channel or an enhanced-physical-downlink-control-channel,
- a use of range extension,
- a channel type, and
- Quality-of-Service characteristics of a data channel transmission.

11. A centralized network element, comprising:
- at least one processor; and
- at least one memory comprising computer program code, wherein the at least one memory and the computer program code are configured, with the at least one processor, to cause the centralized network element at least to receive from a first network element at least one of:
- impact information for a cell of the first network element when taking at least one of an action related to the cell of the first network element, or an action related to a cell of a second network element, wherein
- the action comprises at least one of muting a physical resource block, changing the cell's on-duration, reducing the cell's transmit power, or beamforming the transmission,
- wherein the impact information for the cell of the network element is calculated by the network element, and quantifies the impact experienced by the cell, if the physical resource block is muted, and
- wherein the impact information comprises at least one of benefit information or penalty information, and a priority factor;
- a request for taking the action related to the cell of the first network element or the cell of the second network element; and
- transmit a command for taking the action related to the cell of the first network element or the cell of the second network element based on at least the received impact information or the request.

12. The centralized network element of claim 11, wherein the impact information comprises at least one of benefit information, penalty information, or net benefit information.

13. The centralized network element of claim 11, wherein the priority factor is based on at least one of:
- a congestion of a physical-downlink-control-channel or an enhanced-physical-downlink-control-channel,
- a use of range extension,
- a channel type, and
- Quality-of-Service characteristics of a data channel transmission.

14. A method, comprising:
- transmitting, by a network element, at least one of:
- calculated impact information for a cell of the network element when taking at least one of an action related to the cell of the network element or taking an action related to a cell of a second network element, wherein
- the action comprises at least one of muting a physical resource block, changing the cell's on-duration, reducing the cell's transmit power, or beamforming the transmission,
- wherein the impact information for the cell of the network element is calculated by the network element, and quantifies the impact experienced by the cell, if the physical resource block is muted, and
- wherein the impact information comprises at least one of benefit information or penalty information, and a priority factor, and
- a request for taking the action related to the cell of the second network element.

15. The method according claim 14, wherein the benefit information or penalty information further comprises at least one of:
- an amount of resources for the action;
- an indication of specific frequency resources for the action;

an indication of specific frequency sub-band resource for the action;
an indication of beamforming coefficients;
an indication of specific time for the action; or
an indication of the duration for the action.

16. The method according to claim 14, further comprising:
calculating a net benefit based on the calculated impact information; and
transmitting the net benefit to the second network element.

17. The method according to claim 14, wherein the priority factor is based on at least one of:
a congestion of a physical-downlink-control-channel or an enhanced-physical-downlink-control-channel,
a use of range extension,
a channel type, and
Quality-of-Service characteristics of a data channel transmission.

18. A method, comprising:
receiving, by a network element, at least one of:
impact information for a cell of a second network element when taking at least one of an action related to the cell of the second network element or an action related to a cell of the network element, wherein
the action comprises at least one of muting a physical resource block, changing the cell's on-duration, reducing the cell's transmit power, or beamforming the transmission,
wherein the impact information for the cell of the network element is calculated by the network element, and quantifies the impact experienced by the cell, if the physical resource block is muted, and
wherein the impact information comprises at least one of benefit information or penalty information, and a priority factor;
a request from the second network element for taking the action related to the cell of the network element;
a command from a central network element for taking the action related to the cell of the network element; and
taking the action related to the cell of the network element based on at least one of the received impact information, the command, or the request.

19. The method according to claim 18, further comprising:
calculating a penalty or benefit for taking the action;
calculating a net benefit based on the received impact information and the calculated penalty information or benefit information; and
determining whether to undertake the action based on the calculated net benefit.

20. The method according to claim 19, wherein the determining whether to undertake the action further comprises:
receiving net benefit information from at least one other network element; and
determining to undertake the action based on a comparison of the calculated net benefit and the net benefit information received from the at least one other network element.

21. The method according to claim 18, wherein the priority factor is based on at least one of:
a congestion of a physical-downlink-control-channel or an enhanced-physical-downlink-control-channel,
a use of range extension,
a channel type, and
Quality-of-Service characteristics of a data channel transmission.

22. A method, comprising:
receiving, by a centralized network element, from a first network element at least one of:
impact information for a cell of the first network element when taking at least one of an action related to the cell of the first network element or an action related to a cell of a second network element, wherein
the action comprises at least one of muting a physical resource block, changing the cell's on-duration, reducing the cell's transmit power, or beamforming the transmission,
wherein the impact information for the cell of the network element is calculated by the network element, and quantifies the impact experienced by the cell, if the physical resource block is muted, and
wherein the impact information comprises at least one benefit information or penalty information, and a priority factor;
a request for taking the action related to the cell of the first network element or the cell of the second network element; and
transmitting a command for taking the action related to the cell of the first network element or the cell of the second network element based on at least one of the received impact information or the request.

23. The method according to claim 22, wherein the impact information comprises at least one of benefit information, penalty information, or net benefit information.

24. The method according to claim 22, wherein the priority factor is based on at least one of:
a congestion of a physical-downlink-control-channel or an enhanced-physical-downlink-control-channel,
a use of range extension,
a channel type, and
Quality-of-Service characteristics of a data channel transmission.

\* \* \* \* \*